United States Patent
Rosenstein et al.

(10) Patent No.: US 8,972,061 B2
(45) Date of Patent: Mar. 3, 2015

(54) AUTONOMOUS COVERAGE ROBOT

(71) Applicant: iRobot Corporation, Bedford, MA (US)

(72) Inventors: Michael T. Rosenstein, S. Hadley, MA (US); Mark Chiappetta, Chelmsford, MA (US); Mark Schnittman, Somerville, MA (US); Andrew Pastore, Watertown, MA (US)

(73) Assignee: iRobot Corporation, Bedford, MA (US)

( * ) Notice: Subject to any disclaimer, the term of this patent is extended or adjusted under 35 U.S.C. 154(b) by 98 days.

(21) Appl. No.: 13/790,867

(22) Filed: Mar. 8, 2013

(65) Prior Publication Data

US 2014/0124004 A1    May 8, 2014

Related U.S. Application Data

(60) Provisional application No. 61/721,912, filed on Nov. 2, 2012.

(51) Int. Cl.
*A47L 11/40* (2006.01)
*A47L 9/28* (2006.01)
(Continued)

(52) U.S. Cl.
CPC .......... *A47L 11/4011* (2013.01); *A47L 9/2852* (2013.01); *G05D 1/0246* (2013.01); *G06T 7/00* (2013.01); *A47L 2201/06* (2013.01); *G05D 2201/0203* (2013.01); *Y10S 901/01* (2013.01)
USPC ............................................. 700/259; 901/1

(58) Field of Classification Search
CPC ... Y10S 901/01; Y10S 901/47; Y10S 901/46; G05D 1/0242; G05D 1/0246; G05D 2201/0203; G05D 2201/0215; G05D 1/0251; B25J 9/0003; B25J 9/1697; B25J 5/007; B25J 19/023; B25J 11/0085; A47L 2201/04; A47L 2201/00; A47L 11/40; G06K 9/00664
USPC ........ 700/250, 253, 255, 258, 259; 901/1, 46, 901/47
See application file for complete search history.

(56) References Cited

U.S. PATENT DOCUMENTS 5,252,951 A    10/1993   Tannenbaum et al.
5,754,631 A    5/1998    Cave
(Continued)

FOREIGN PATENT DOCUMENTS

KR    10-2005-0087644    8/2005
KR    10-2011-0127946    11/2011

OTHER PUBLICATIONS

Johns Hopkins Medical Institutions, "Dr. Robot Tested at Hopkins," 2003, Aug. 5, 2003, p. 1-2.
(Continued)

*Primary Examiner* — Jason Holloway
(74) *Attorney, Agent, or Firm* — Honigman Miller Schwartz and Cohn LLP

(57) ABSTRACT

A mobile floor cleaning robot includes a robot body supported by a drive system configured to maneuver the robot over a floor surface. The robot also includes a cleaning system supported by the robot body, an imaging sensor disposed on the robot body, and a controller in communicates with the drive system and the imaging sensor. The controller receives a sequence of images of the floor surface; each image has an array of pixels. For each image, the controller segments the image into color blobs by color quantizing pixels of the image, determines a spatial distribution of each color of the image based on corresponding pixel locations; and for each image color, identifies areas of the image having a threshold spatial distribution for that color. The controller then tracks a location of the color blobs with respect to the imaging sensor across the sequence of images.

59 Claims, 17 Drawing Sheets

(51) Int. Cl.
  *G05D 1/02* (2006.01)
  *G06T 7/00* (2006.01)

(56) References Cited

U.S. PATENT DOCUMENTS

| | | | |
|---|---|---|---|
| 5,999,525 | A | 12/1999 | Krishnaswamy et al. |
| 6,335,927 | B1 | 1/2002 | Elliott et al. |
| 6,356,806 | B1 | 3/2002 | Grob et al. |
| 6,389,329 | B1 | 5/2002 | Colens |
| 6,532,404 | B2 | 3/2003 | Colens |
| 6,549,215 | B2 | 4/2003 | Jouppi |
| 6,554,433 | B1 | 4/2003 | Holler |
| 6,594,269 | B1 | 7/2003 | Polcyn |
| 6,594,844 | B2 | 7/2003 | Jones |
| 6,690,134 | B1 | 2/2004 | Jones et al. |
| 6,731,625 | B1 | 5/2004 | Eastep et al. |
| 6,754,181 | B1 | 6/2004 | Elliott et al. |
| 6,781,338 | B2 | 8/2004 | Jones et al. |
| 6,781,606 | B2 | 8/2004 | Jouppi |
| 6,809,490 | B2 | 10/2004 | Jones et al. |
| 6,842,877 | B2 | 1/2005 | Robarts et al. |
| 6,909,708 | B1 | 6/2005 | Krishnaswamy et al. |
| 6,965,209 | B2 | 11/2005 | Jones et al. |
| 6,967,958 | B2 | 11/2005 | Ono et al. |
| 6,999,431 | B2 | 2/2006 | Rines |
| 7,145,898 | B1 | 12/2006 | Elliott |
| 7,155,308 | B2 | 12/2006 | Jones |
| 7,173,391 | B2 | 2/2007 | Jones et al. |
| 7,196,487 | B2 | 3/2007 | Jones et al. |
| 7,228,203 | B2 | 6/2007 | Koselka et al. |
| 7,283,893 | B2 | 10/2007 | Hara et al. |
| 7,286,474 | B2 | 10/2007 | Garg et al. |
| 7,388,343 | B2 | 6/2008 | Jones et al. |
| 7,389,156 | B2 | 6/2008 | Ziegler et al. |
| 7,428,216 | B2 | 9/2008 | Siddiqui et al. |
| 7,448,113 | B2 | 11/2008 | Jones et al. |
| 7,571,511 | B2 | 8/2009 | Jones et al. |
| 7,626,569 | B2 | 12/2009 | Lanier |
| 7,633,586 | B2 | 12/2009 | Winlow et al. |
| 7,636,982 | B2 | 12/2009 | Jones et al. |
| 7,720,572 | B2 | 5/2010 | Ziegler et al. |
| 7,761,954 | B2 | 7/2010 | Ziegler et al. |
| 7,805,220 | B2 * | 9/2010 | Taylor et al. ............... 700/253 |
| 7,957,837 | B2 | 6/2011 | Ziegler et al. |
| 8,085,761 | B2 | 12/2011 | Elliott et al. |
| 8,195,333 | B2 | 6/2012 | Ziegler et al. |
| 8,265,793 | B2 | 9/2012 | Cross et al. |
| 8,565,920 | B2 | 10/2013 | Casey et al. |
| 8,761,935 | B2 | 6/2014 | Casey et al. |
| 2001/0021186 | A1 | 9/2001 | Ono et al. |
| 2002/0016649 | A1 | 2/2002 | Jones |
| 2002/0083462 | A1 | 6/2002 | Arnott |
| 2002/0114318 | A1 | 8/2002 | Rines |
| 2002/0120364 | A1 | 8/2002 | Colens |
| 2003/0003962 | A1 | 1/2003 | Vooi-Kia et al. |
| 2003/0025472 | A1 | 2/2003 | Jones et al. |
| 2004/0008627 | A1 | 1/2004 | Garg et al. |
| 2004/0020000 | A1 | 2/2004 | Jones |
| 2004/0037414 | A1 | 2/2004 | Pramodkumar et al. |
| 2004/0049877 | A1 | 3/2004 | Jones et al. |
| 2004/0083570 | A1 | 5/2004 | Song et al. |
| 2004/0114581 | A1 | 6/2004 | Hans et al. |
| 2004/0187457 | A1 | 9/2004 | Colens |
| 2004/0204074 | A1 | 10/2004 | Desai |
| 2004/0207355 | A1 | 10/2004 | Jones et al. |
| 2005/0000543 | A1 * | 1/2005 | Taylor et al. ............... 134/18 |
| 2005/0050090 | A1 | 3/2005 | Kawahata et al. |
| 2005/0057699 | A1 | 3/2005 | Bowser |
| 2005/0067994 | A1 | 3/2005 | Jones et al. |
| 2005/0192707 | A1 * | 9/2005 | Park et al. ............... 700/259 |
| 2005/0204717 | A1 | 9/2005 | Colens |
| 2005/0286494 | A1 | 12/2005 | Hollatz et al. |
| 2006/0182029 | A1 | 8/2006 | Kealy et al. |
| 2007/0097963 | A1 | 5/2007 | Thermos |
| 2007/0136405 | A1 | 6/2007 | Weinstein et al. |
| 2007/0192910 | A1 | 8/2007 | Vu et al. |
| 2007/0198128 | A1 | 8/2007 | Ziegler et al. |
| 2007/0199108 | A1 | 8/2007 | Angle et al. |
| 2007/0266508 | A1 | 11/2007 | Jones et al. |
| 2008/0025295 | A1 | 1/2008 | Elliott et al. |
| 2008/0084991 | A1 | 4/2008 | Chuang et al. |
| 2008/0140255 | A1 | 6/2008 | Ziegler et al. |
| 2008/0155768 | A1 | 7/2008 | Ziegler et al. |
| 2008/0184518 | A1 | 8/2008 | Taylor et al. |
| 2008/0307590 | A1 | 12/2008 | Jones et al. |
| 2009/0006555 | A1 | 1/2009 | Curren et al. |
| 2009/0129369 | A1 | 5/2009 | Turk |
| 2009/0177323 | A1 | 7/2009 | Ziegler et al. |
| 2010/0049365 | A1 | 2/2010 | Jones et al. |
| 2010/0257690 | A1 | 10/2010 | Jones et al. |
| 2010/0257691 | A1 | 10/2010 | Jones et al. |
| 2010/0263158 | A1 | 10/2010 | Jones et al. |
| 2011/0172822 | A1 | 7/2011 | Ziegler et al. |
| 2012/0103367 | A1 | 5/2012 | Tang |
| 2013/0139193 | A1 | 5/2013 | Fan et al. |

OTHER PUBLICATIONS

Nakajima et al., "A Multimedia Teleteaching System Using an Electronic Whiteboard for Two-Way Communication of Motion Videos and Chalkboards," IEEE International Workshop on Robot and Human Communication, 1993, p. 436-441.

Salemi et al., "MILO: Personal Robot Platform," Internet, p. 1-6.

International Search Report and Written Opinion of WO Application No. PCT/US2013/065459, dated Jan. 20, 2014.

* cited by examiner

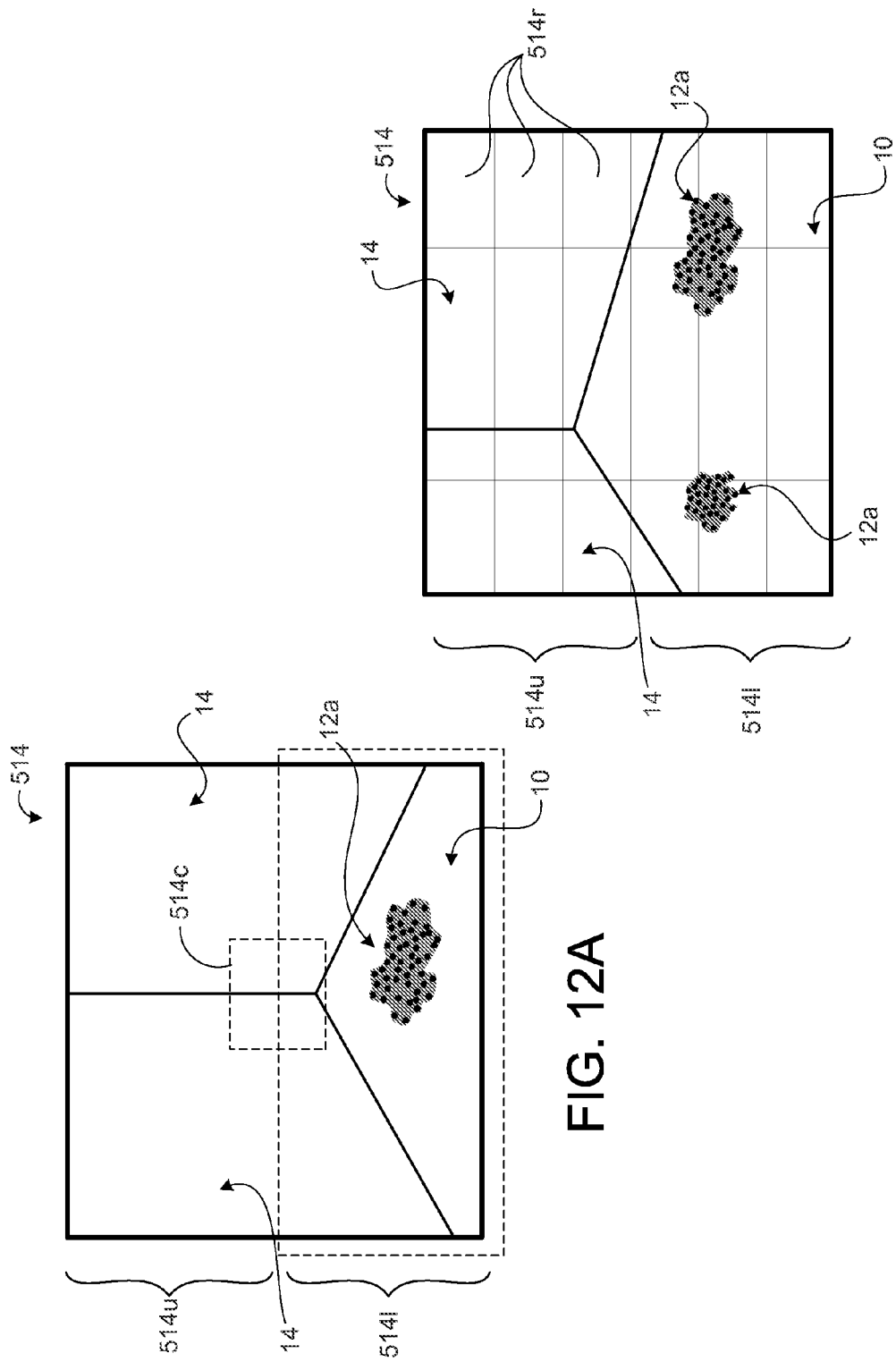

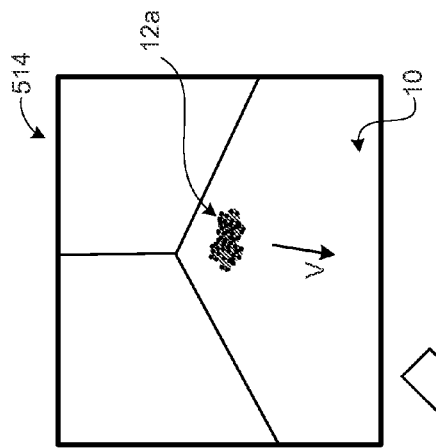
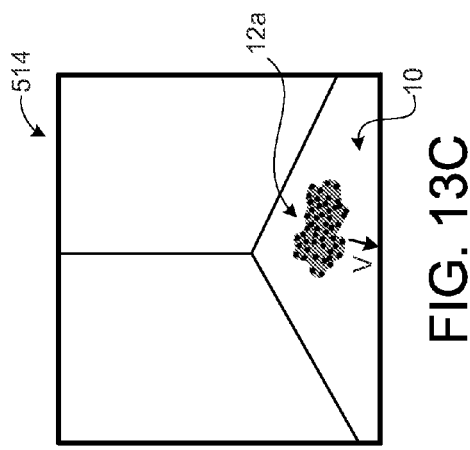
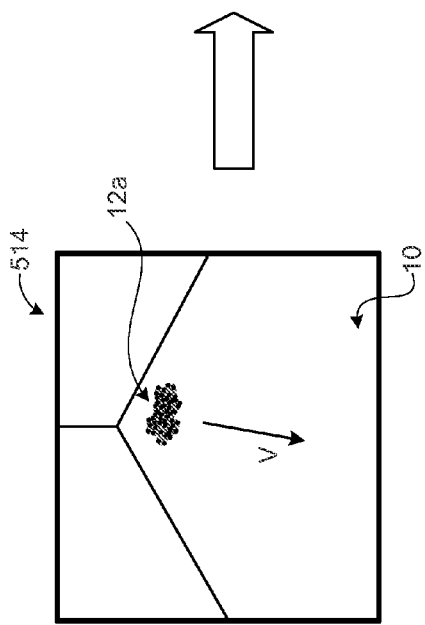
FIG. 13A
FIG. 13B
FIG. 13C

AUTONOMOUS COVERAGE ROBOT

CROSS REFERENCE TO RELATED APPLICATIONS

This U.S. patent application claims priority under 35 U.S.C. §119(e) to U.S. Provisional Application 61/721,912, filed on Nov. 2, 2012, which is hereby incorporated by reference in its entirety.

TECHNICAL FIELD

This disclosure relates to surface cleaning robots.

BACKGROUND

A vacuum cleaner generally uses an air pump to create a partial vacuum for lifting dust and dirt, usually from floors, and optionally from other surfaces as well. The vacuum cleaner typically collects dirt either in a dust bag or a cyclone for later disposal. Vacuum cleaners, which are used in homes as well as in industry, exist in a variety of sizes and models, such as small battery-operated hand-held devices, domestic central vacuum cleaners, huge stationary industrial appliances that can handle several hundred liters of dust before being emptied, and self-propelled vacuum trucks for recovery of large spills or removal of contaminated soil.

Autonomous robotic vacuum cleaners generally navigate, under normal operating conditions, a living space and common obstacles while vacuuming the floor. Autonomous robotic vacuum cleaners generally include sensors that allow it to avoid obstacles, such as walls, furniture, or stairs. The robotic vacuum cleaner may alter its drive direction (e.g., turn or back-up) when it bumps into an obstacle. The robotic vacuum cleaner may also alter drive direction or driving pattern upon detecting exceptionally dirty spots on the floor.

SUMMARY

An autonomous coverage robot having a navigation system that can detect, navigate towards, and spot clean an area of floor having a threshold level of dirt or debris (e.g., noticeable by human visual inspection) may efficiently and effectively clean a floor surface of a floor area (e.g., a room). By hunting for dirt or having an awareness for detecting a threshold level of dirt or debris and then targeting a corresponding floor area for cleaning, the robot can spot clean relatively more dirty floor areas before proceeding to generally clean the entire floor area of the floor area.

One aspect of the disclosure provides a method of operating mobile floor cleaning robot. The method includes identifying a location of an object on a floor surface away from the robot, driving across the floor surface to clean the floor surface at the identified location of the object, and determining whether the object persists on the floor surface. When the object persists, the method includes driving across the floor surface to re-clean the floor surface at the identified location of the object.

Implementations of the disclosure may include one or more of the following features. In some implementations, after cleaning the floor surface at the identified object location, the method includes maneuvering to determine whether the object persists on the floor surface. The method may include receiving a sequence of images of a floor surface supporting the robot, where each image has an array of pixels. The method further includes segmenting each image into color blobs by: color quantizing pixels of the image, determining a spatial distribution of each color of the image based on corresponding pixel locations, and then for each image color, identifying areas of the image having a threshold spatial distribution for that color. The method includes tracking a location of each color blob with respect to the imaging sensor across the sequence of images.

In some examples, color quantizing pixels is applied in a lower portion of the image oriented vertically, and/or outside of a center portion of the image. The step of segmenting the image into color blobs may include dividing the image into regions and separately color quantizing the pixels of each region and/or executing a bit shifting operation to convert each pixel from a first color set to second color set smaller than the first color set. The bit shifting operation may retain the three most significant bits of each of a red, green and blue channel.

Tracking a location of the color blobs may include determining a velocity vector of each color blob with respect to the imaging, and recording determined color blob locations for each image of the image sequence. In some examples, the method includes determining a size of each color blob. The method may include issuing a drive command to maneuver the robot based on the location of one or more color blobs and/or to maneuver the robot towards a nearest color blob. The nearest color blob may be identified in a threshold number of images of the image sequence.

In some examples, the method includes determining a size of each color blob, determining a velocity vector of each color blob with respect to the imaging sensor, and issuing a drive command to maneuver the robot based on the size and the velocity vector of one or more color blobs. The drive command may be issued to maneuver the robot towards a color blob having the largest size and velocity vector toward the robot. The method may further comprise executing a heuristic related to color blob size and color blob speed to filter out color blobs non-indicative of debris on the floor surface.

In some examples, the method includes assigning a numerical representation for the color of each pixel in a color space. The color quantizing of the image pixels may be in a red-green-blue color space, reducing the image to a 9-bit red-green-blue image or in a LAB color space.

The method may further include executing a control system having a control arbitration system and a behavior system in communication with each other. The behavior system executing a cleaning behavior. The cleaning behavior influencing execution of commands by the control arbitration system based on the image segmentation to identify color blobs corresponding to a dirty floor area and color blob tracking to maneuver over the dirty floor area thr cleaning using a cleaning system of the robot.

Another aspect of the disclosure provides a mobile floor cleaning robot having a robot body with a forward drive direction. The mobile floor cleaning robot has a drive system, a cleaning system, an imaging sensor, and a controller. The drive system supports the robot body and is configured to maneuver the robot over a floor surface. The robot body supports the cleaning system and the imaging sensor. The controller receives a sequence of images of the floor surface, where each image has an array of pixels. The controller then segments the image into color blobs. The segmenting process begins by color quantizing pixels of the image. Next, the controller determines a spatial distribution of each color of the image based on corresponding pixel locations. Lastly, the controller identifies areas of the image with a threshold spatial distribution for that color. Once the controller segments the image, the controller tracks a location of each color blob with respect to the imaging sensor across the sequence of images.

In some implementations, the controller segments the image into color blobs by color quantizing pixels in a lower portion of the image oriented vertically and/or outside of a center portion of the image. The controller may divide the image into regions and separately color quantizes the pixels of each region. In some examples, the controller executes a bit shifting operation to convert each pixel from a first color set to second color set smaller than the first color set. The bit shifting operation may retain the three most significant bits of each of a red, green and blue channel.

In some examples, the image sensor has a camera with a field of view along a forward drive direction of the robot. The camera may scan side-to-side or up-and-down with respect to the forward drive direction of the robot.

Tracking a location of the color blobs may include determining a velocity vector of each color blob with respect to the imaging sensor, and recording determined color blob locations for each image of the image sequence. In some examples, the controller determines a size of each color blob. The controller may issue a drive command to maneuver the robot based on the location of one or more blobs. The drive command may maneuver the robot towards the nearest color blob. In some examples, the controller identifies the nearest color blob in a threshold number of images of the image sequence.

In some implementations, the controller determines a size of each color blob, and a velocity vector of each color blob with respect to the imaging sensor. The controller issues a drive command to maneuver the robot based on the size and the velocity vector of one or more color blobs. The controller may issue a drive command to maneuver the robot towards a color blob having the largest size and velocity vector toward the robot. In some examples, the controller executes a heuristic related to color blob size and color blob speed to filter out color blobs non-indicative of debris on the floor surface.

The controller may assign a numerical representation for the color of each pixel in a color space. The controller may quantize the image pixels in a red-green-blue color space, reducing the image to a 9-bit red-green-blue image, or in a LAB color space.

Another aspect of the disclosure provides a mobile floor cleaning robot including a robot body, a drive system, a controller, a cleaning system, an imaging sensor. The robot body has a forward drive direction. The drive system supports the robot body and is configured to maneuver the robot over a floor surface. The controller communicates with the cleaning system, the imaging sensor, the drive system, and executes a control system. The robot body supports the cleaning system. The control system includes a control arbitration system and a behavior system in communication with each other. The behavior system executes a cleaning behavior and influences the execution of commands by the control arbitration system based on a sequence of images of the floor surface received from the imaging sensor to identify a dirty floor area and maneuver the cleaning system over the dirty floor area. The cleaning behavior identifies the dirty floor area by segmenting each image into color blobs. Segmenting an image includes color quantizing pixels of the image, determining a spatial distribution of each color of the image based on corresponding pixel locations, and for each image color, identifying areas of the image having a threshold spatial distribution for that color. The cleaning behavior then tracks a location of each color blob with respect to the imaging sensor across the sequence of images.

Another aspect of the disclosure provides a method of operating a mobile cleaning robot having an imaging sensor. The method includes receiving a sequence of images of a floor surface supporting the robot, where each image has an array of pixels. The method further includes segmenting each image into color blobs by: color quantizing pixels of the image, determining a spatial distribution of each color of the image based on corresponding pixel locations, and then for each image color, identifying areas of the image having a threshold spatial distribution for that color. The method includes tracking a location of each color blob with respect to the imaging sensor across the sequence of images.

In some examples, color quantizing pixels is applied in a lower portion of the image oriented vertically, and/or outside of a center portion of the image. The step of segmenting the image into color blobs may include dividing the image into regions and separately color quantizing the pixels of each region and/or executing a bit shifting operation to convert each pixel from a first color set to second color set smaller than the first color set. The bit shifting operation may retain the three most significant bits of each of a red, green and blue channel.

In some examples, the image sensor comprises a camera arranged to have a field of view along a forward drive direction of the robot. The method may include scanning the camera side-to-side or up-and-down with respect to the forward drive direction of the robot.

Tracking a location of the color blobs may include determining a velocity vector of each color blob with respect to the imaging, and recording determined color blob locations for each image of the image sequence. In some examples, the method includes determining a size of each color blob. The method may include issuing a drive command to maneuver the robot based on the location of one or more color blobs and/or to maneuver the robot towards a nearest color blob. The nearest color blob may be identified in a threshold number of images of the image sequence.

In some examples, the method includes determining a size of each color blob, determining a velocity vector of each color blob with respect to the imaging sensor, and issuing a drive command to maneuver the robot based on the size and the velocity vector of one or more color blobs. The drive command may be issued to maneuver the robot towards a color blob having the largest size and velocity vector toward the robot. The method may further comprise executing a heuristic related to color blob size and color blob speed to filter out color blobs non-indicative of debris on the floor surface.

In some examples, the method includes assigning a numerical representation for the color of each pixel in a color space. The color quantizing of the image pixels may be in a red-green-blue color space, reducing the image to a 9-bit red-green-blue image or in a LAB color space.

The method may further include executing a control system having a control arbitration system and a behavior system in communication with each other. The behavior system executing a cleaning behavior. The cleaning behavior influencing execution of commands by the control arbitration system based on the image segmentation to identify color blobs corresponding to a dirty floor area and color blob tracking to maneuver over the dirty floor area for cleaning using a cleaning system of the robot.

In yet another aspect of the disclosure, a computer program product encoded on a non-transitory computer readable storage medium includes instructions that when executed by a data processing apparatus cause the data processing apparatus to perform operations. The operations include receiving a sequence of images of a floor surface, each image having an array of pixels, and for each image, segmenting the image into color blobs by. Segmenting the image into color blobs includes color quantizing pixels of the image and determining a spatial distribution of each color of the image based on corresponding pixel locations. In addition, segmenting the image includes identifying areas of the image having a threshold spatial distribution for that color, for each image color. The computer program product also includes tracking a location of each color blob with respect to the imaging sensor across the sequence of images.

Segmenting the image into color blobs may only color quantize pixels in a lower portion of the image oriented vertically and/or pixels outside of a center portion of the image. In some examples, segmenting the image into color blobs may include dividing the image into regions and separately color quantizing the pixels of each region. Segmenting the image into color blobs may include executing a bit shifting operation to convert each pixel from a first color set to second color set smaller than the first color set. The bit shifting operation retains the three most significant bits of each of a red, green and blue channel.

Tracking a location of the color blobs may include determining a velocity vector of each color blob with respect to the imaging, and recording determined color blob locations for each image of the image sequence. In some examples the computer program includes determining a size of each blob. In some implementations, the computer program includes issuing a drive command to maneuver a robot based on the location of one or more color blobs. The drive command may be to maneuver the robot towards a nearest color blob, which may be identified in a threshold number of images of the image sequence.

In some examples, the operations include determining a size of each color blob, determining a velocity vector of each color blob with respect to an imaging sensor capturing the received image sequence, and issuing a drive command to maneuver a robot based on the size and the velocity vector of one or more color blobs. The drive command may be to maneuver the robot towards a color blob having the largest size and velocity vector toward the robot. In some examples, the operations include executing a heuristic related to color blob size and color blob speed to filter out color blobs non-indicative of debris on the floor surface.

In some examples, the computer program product assigns a numerical representation for the color of each pixel in a color space. The color spaces used may be in a red-green-blue color space or a LAB color space. Thus, the operations may color quantize the image pixels in the red-green-blue color space, reducing the image to a 9-bit red-green-blue image, or in a LAB color space.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 12A and 12B are schematic views of exemplary images captured by a camera on a mobile floor cleaning robot and divided into upper and lower portions.

FIG. 13A-13C are schematic views of a progression of images captured by a mobile floor cleaning robot, as the robot approaches a recognized image blob.

Like reference symbols in the various drawings indicate like elements.

DETAILED DESCRIPTION

An autonomous robot movably supported can clean a surface while traversing that surface. The robot can remove debris from the surface by agitating the debris and/or lifting the debris from the surface by applying a negative pressure (e.g., partial vacuum) above the surface, and collecting the debris from the surface.

Figure 1:
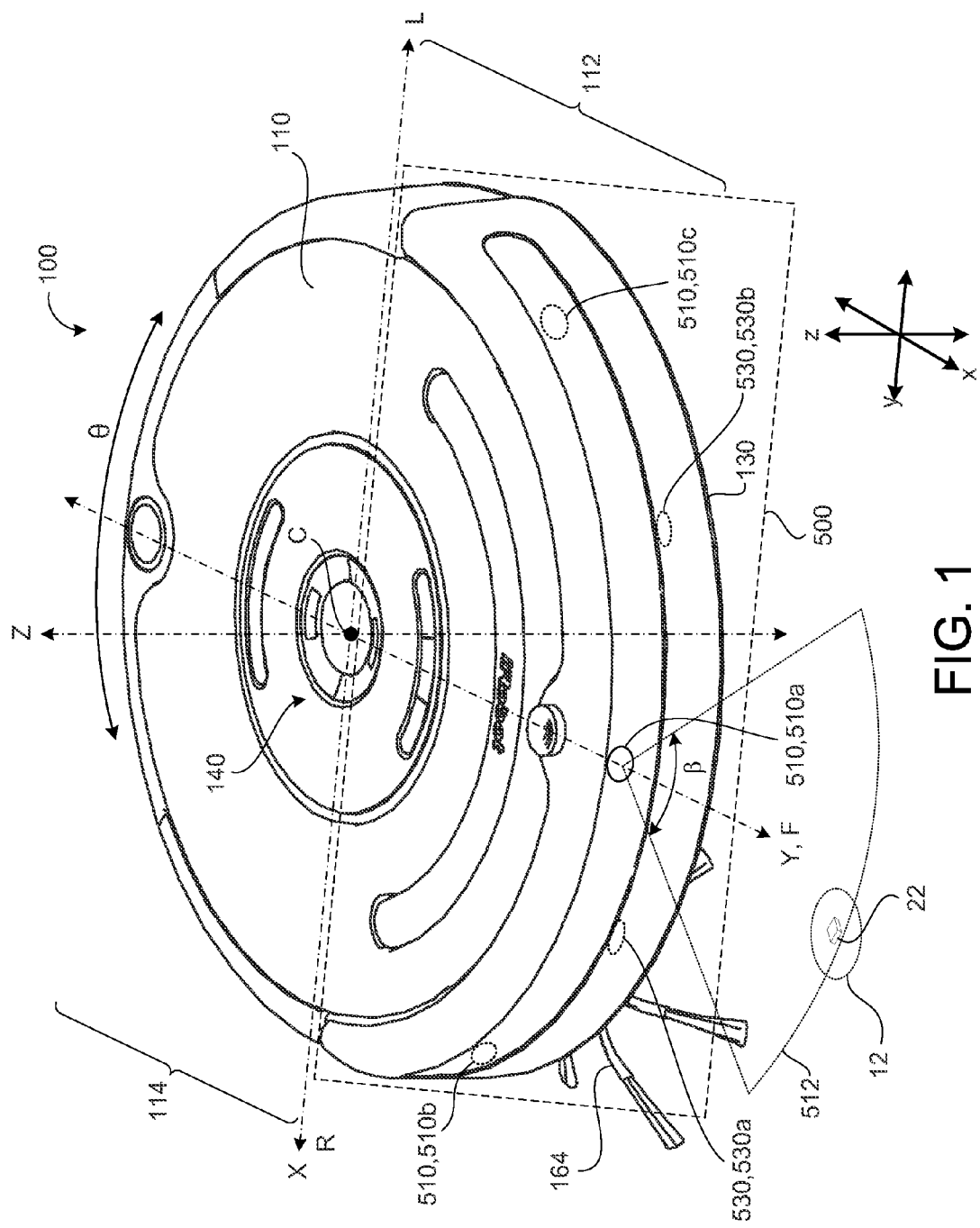
FIG. 1 is a perspective view of an exemplary mobile floor cleaning robot.
Figure 2:
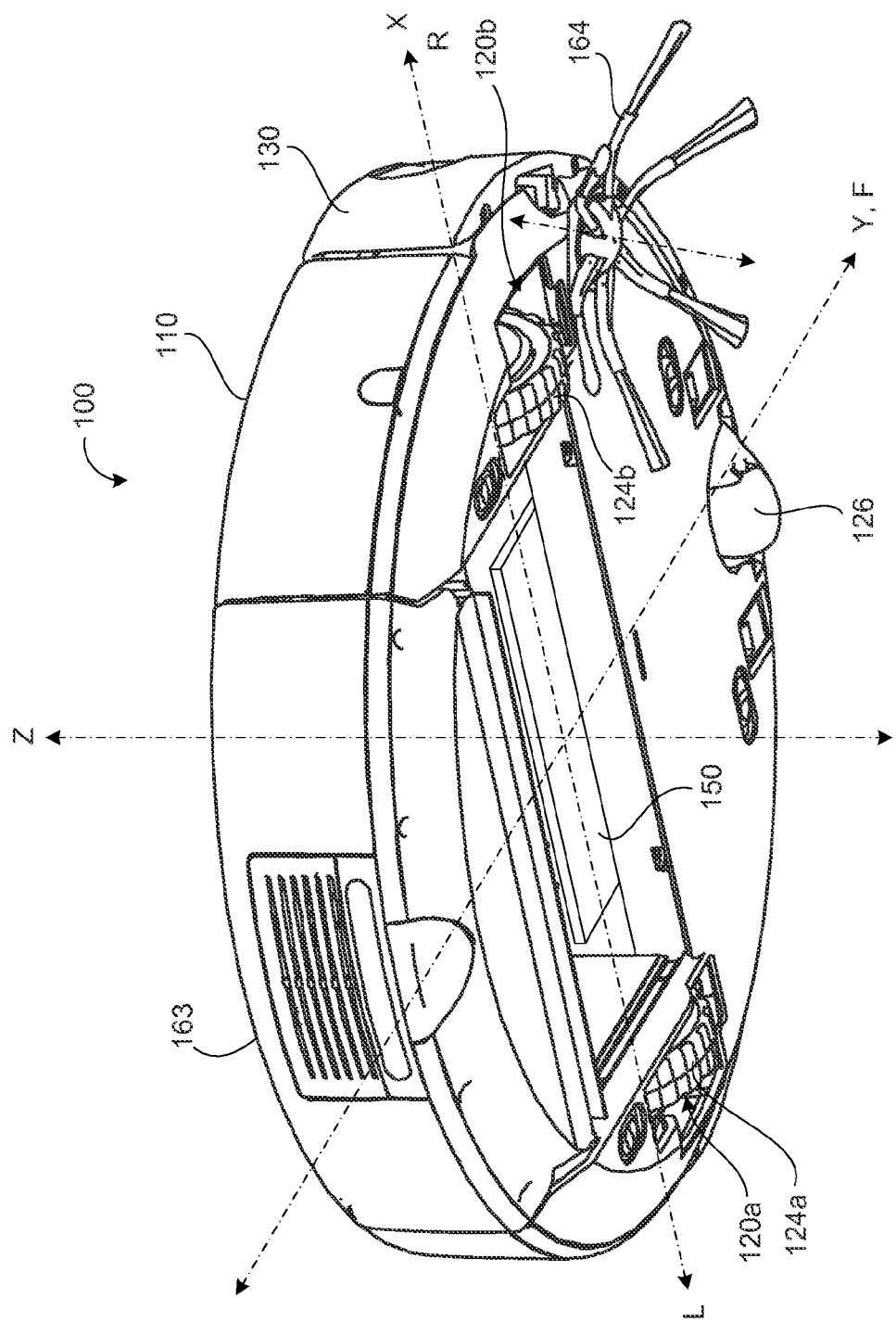
FIG. 2 is a side view of the exemplary mobile floor cleaning robot shown in FIG. 1.
Figure 3:
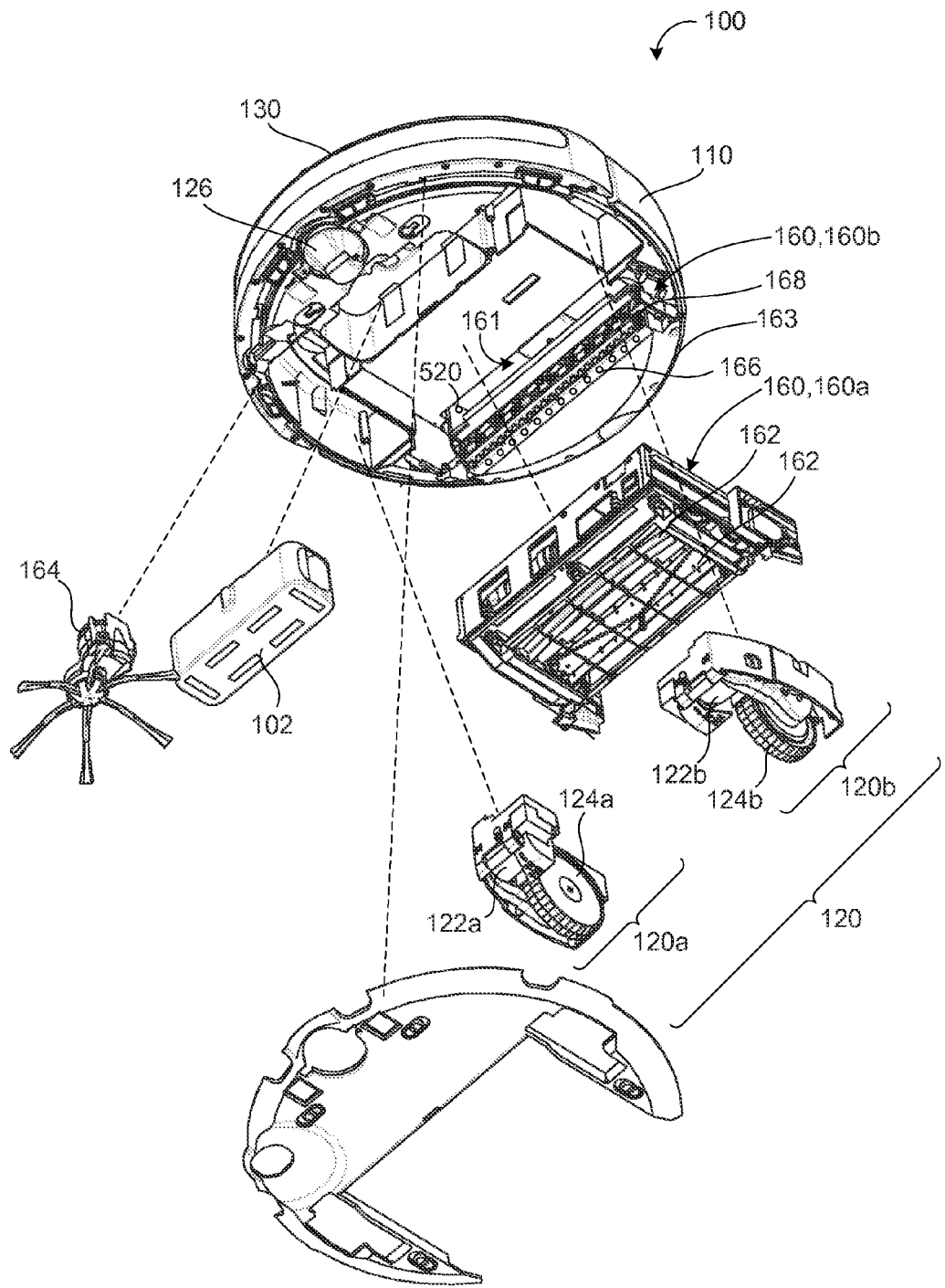
FIG. 3 is a bottom view of the exemplary mobile floor cleaning robot shown in FIG. 1.

Referring to FIGS. 1-3, in some implementations, a robot 100 includes a body 110 supported by a drive system 120 that can maneuver the robot 100 across the floor surface 10 based on a drive command having x, y, and θ components, for example, issued by a controller 150. The robot body 110 has a forward portion 112 and a rearward portion 114. The drive system 120 includes right and left driven wheel modules 120a, 120b that may provide odometry to the controller 150. The wheel modules 120a, 120b are substantially opposed along a transverse axis X defined by the body 110 and include respective drive motors 122a, 122b driving respective wheels 124a, 124b. The drive motors 122a, 122b may releasably connect to the body 110 (e.g., via fasteners or tool-less connections) with the drive motors 122a, 122b optionally positioned substantially over the respective wheels 124a, 124b. The wheel modules 120a, 120b can be releasably attached to the chassis 110 and forced into engagement with the cleaning surface 10 by respective springs. The robot 100 may include a caster wheel 126 disposed to support a forward portion 112 of the robot body 110. The robot body 110 supports a power source 102 (e.g., a battery) for powering any electrical components of the robot 100.

The robot 100 can move across the cleaning surface 10 through various combinations of movements relative to three mutually perpendicular axes defined by the body 110: a transverse axis X, a fore-aft axis Y, and a central vertical axis Z. A forward drive direction along the fore-aft axis Y is designated F (sometimes referred to hereinafter as "forward"), and an aft drive direction along the fore-aft axis Y is designated A (sometimes referred to hereinafter as "rearward"). The transverse axis X extends between a right side R and a left side L of the robot 100 substantially along an axis defined by center points of the wheel modules 120a, 120b.

A forward portion 112 of the body 110 carries a bumper 130, which detects (e.g., via one or more sensors) one or more events in a drive path of the robot 100, for example, as the wheel modules 120a, 120b propel the robot 100 across the cleaning surface 10 during a cleaning routine. The robot 100 may respond to events (e.g., obstacles, cliffs, walls) detected by the bumper 130 by controlling the wheel modules 120a, 120b to maneuver the robot 100 in response to the event (e.g., away from an obstacle). While some sensors are described herein as being arranged on the bumper, these sensors can additionally or alternatively be arranged at any of various different positions on the robot 100.

A user interface 140 disposed on a top portion of the body 110 receives one or more user commands and/or displays a status of the robot 100. The user interface 140 is in communication with the robot controller 150 carried by the robot 100 such that one or more commands received by the user interface 140 can initiate execution of a cleaning routine by the robot 100.

The robot controller 150 (executing a control system) may execute behaviors 300 (FIG. 4) that cause the robot 100 to take an action, such as maneuvering in a will following manner, a floor scrubbing manner, or changing its direction of travel when an obstacle is detected. The robot controller 150 can maneuver the robot 100 in any direction across the cleaning surface 10 by independently controlling the rotational speed and direction of each wheel module 120a, 120b. For example, the robot controller 150 can maneuver the robot 100 in the forward F, reverse (aft) A, right R, and left L directions. As the robot 100 moves substantially along the fore-aft axis Y, the robot 100 can make repeated alternating right and left turns such that the robot 100 rotates back and forth around the center vertical axis Z (hereinafter referred to as a wiggle motion). The wiggle motion can allow the robot 100 to operate as a scrubber during cleaning operation. Moreover, the wiggle motion can be used by the robot controller 150 to detect robot stasis. Additionally or alternatively, the robot controller 150 can maneuver the robot 100 to rotate substantially in place such that the robot 100 can maneuver out of a corner or away from an obstacle, for example. The robot controller 150 may direct the robot 100 over a substantially random (e.g., pseudo-random) path while traversing the cleaning surface 10. The robot controller 150 can be responsive to one or more sensors (e.g., bump, proximity, wall, stasis, and cliff sensors) disposed about the robot 100. The robot controller 150 can redirect the wheel modules 120a, 120b in response to signals received from the sensors, causing the robot 100 to avoid obstacles and clutter while treating the cleaning surface 10. If the robot 100 becomes stuck or entangled during use, the robot controller 150 may direct the wheel modules 120a, 120b through a series of escape behaviors so that the robot 100 can escape and resume normal cleaning operations.

The robot 100 may include a cleaning system 160 for cleaning or treating the floor surface 10. The cleaning system 160 may include a dry cleaning system 160a and/or a wet cleaning system 160b. The dry cleaning system 160 may include a driven roller brush 162 (e.g., with bristles and/or beater flaps) extending parallel to the transverse axis X and rotatably supported by the robot body 110 to contact the floor surface 10. The driven roller brush agitates debris off of the floor surface 10 and throws or guides the agitated debris into a collection bin 163. The dry cleaning system 160 may also include aside brush 164 having an axis of rotation at an angle with respect to the floor surface 10 for moving debris into a cleaning swath area of the cleaning system 160. The wet cleaning system 1601) may include a fluid applicator 166 that extends along the transverse axis X and dispenses cleaning liquid onto the surface 10. The dry and/or wet cleaning systems 160a, 160b may include one or more squeegee vacuums 168 (e.g., spaced apart compliant blades have a partial vacuum applied therebetween via an air pump) vacuuming the cleaning surface 10.

Referring to FIGS. 1-4, to achieve reliable and robust autonomous movement, the robot 100 may include a sensor system 500 having several different types of sensors which can be used in conjunction with one another to create a perception of the robot's environment sufficient to allow the robot 100 to make intelligent decisions about actions to take in that environment. The sensor system 500 may include one or more types of sensors supported by the robot body 110, which may include obstacle detection obstacle avoidance (ODOA) sensors, communication sensors, navigation sensors, etc. For example, these sensors may include, but not limited to, range finding sensors, proximity sensors, contact sensors, a camera (e.g., volumetric point cloud imaging, three-dimensional (3D) imaging or depth map sensors, visible light camera and/or infrared camera), sonar, radar, LIDAR (Light Detection And Ranging, which can entail optical remote sensing that measures properties of scattered light to find range and/or other information of a distant target), LADAR (Laser Detection and Ranging), etc. In some implementations, the sensor system 500 includes ranging sonar sensors, proximity cliff detectors, contact sensors, a laser scanner, and/or an imaging sonar.

There are several challenges involved in placing sensors on a robotic platform. First, the sensors need to be placed such that they have maximum coverage of areas of interest around the robot 100. Second, the sensors may need to be placed in such a way that the robot 100 itself causes an absolute minimum of occlusion to the sensors; in essence, the sensors cannot be placed such that they are "blinded" by the robot itself. Third, the placement and mounting of the sensors should not be intrusive to the rest of the industrial design of the platform. In terms of aesthetics, it can be assumed that a robot with sensors mounted inconspicuously is more "attractive" than otherwise. In terms of utility, sensors should be mounted in a manner so as not to interfere with normal robot operation (snagging on obstacles, etc.).

In some implementations, the sensor system 500 includes one or more imaging sensors 510 disposed on the robot body 110 or bumper 130. In the example shown, an imaging sensor 510, 510a is disposed on an upper portion 132 of the bumper 130 and arranged with a field of view 512 along the forward drive direction F. The field of view 512 may have an angle of between about 45° and about 270°. Moreover, the imaging sensor 510 may scan side-to-side and/or up-and-down with respect to the forward drive direction F to increase a lateral and vertical field of view 512 of the imaging sensor 510. Additionally or alternatively, the sensor system 500 may include multiple cameras 510, such as first, second, and third cameras 510a-c disposed on the bumper 130 and arranged with a field of view 512 substantially normal to the robot body 110 (e.g., radially outward).

The imaging sensor 510 may be a camera that captures visible and/or infrared light, still pictures, and/or video. In some examples, the imaging sensor 510 is a 3-D image sensor (e.g., stereo camera, time-of-flight, or speckle type volumetric point cloud imaging device) may be capable of producing the following types of data: (i) a depth map, (ii) a reflectivity based intensity image, and/or (iii) a regular intensity image. The 3-D image sensor may obtain such data by image pattern matching, measuring the flight time and/or phase delay shift for light emitted from a source and reflected off of a target.

There are several challenges involved when using a camera as an imaging sensor 510. One major challenge is the memory size required to analyze the images captured by the camera. The analysis of these images allows the robot to make intelligent decisions about actions to take in its specific environment. One way to reduce the space needed for storing the images to be analyzed is to reduce the size of the images before analyzing them. Compression reduces the size of the images to conform to the memory size restrictions. Image compression can be lossy or lossless. Lossy compression reduces the size of the image by completely removing some data. Some techniques for lossy image compression include fractal compression, reduction of the color space, chroma subsampling, and transform coding. In lossless compression, no data is lost after compression is performed and the image can be reconstructed to its original data after being compressed. Some techniques for lossless image compression include run-length encoding (RLE), predictive coding, and entropy coding.

Figure 4:
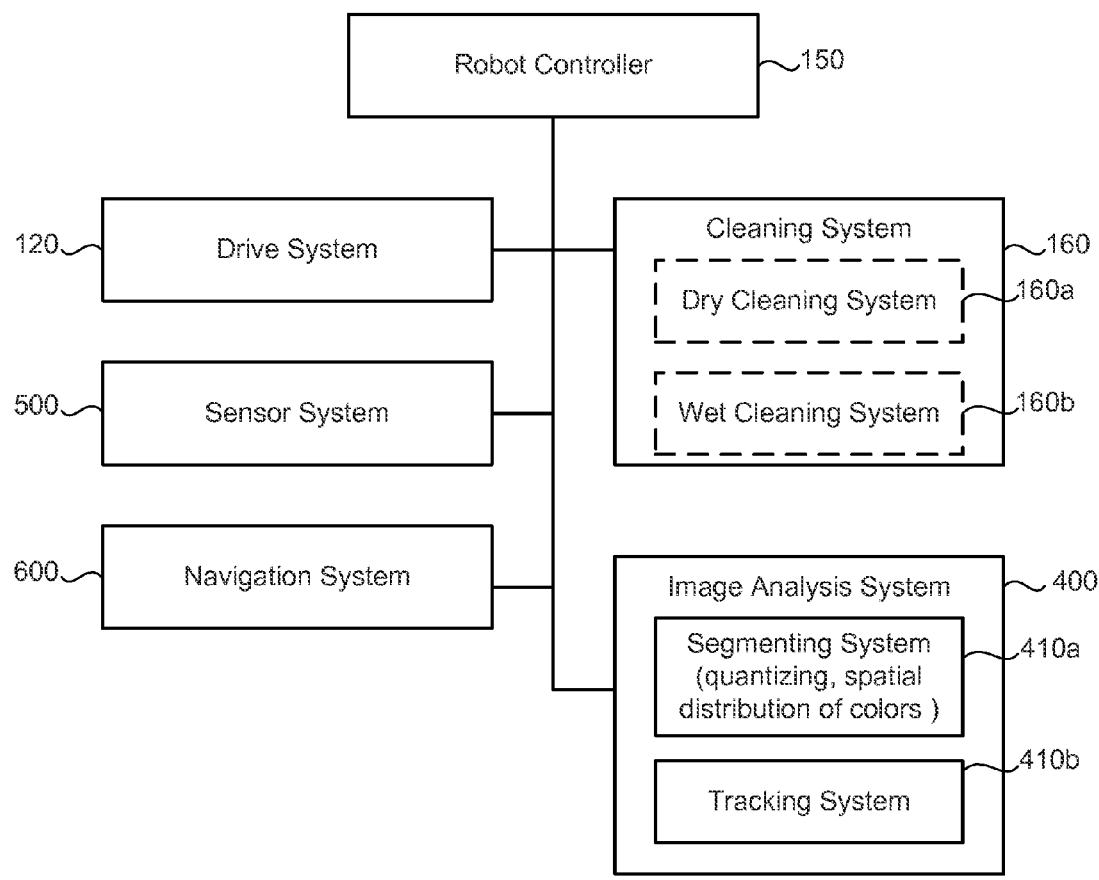
FIG. 4 is a schematic view of an exemplary mobile floor cleaning robot.

Referring to FIGS. 1 and 4, in some implementations, the robot 100 includes an image analysis system 400, configured to analyze an image 514 or sequence 514b of images 514 captured from the imaging sensor system 510. The image analysis system 400 performs two functions. The first function segments the image 514 which may include quantizing the image 514 to reduce its file size for analysis, and the second function identifies and tracks an object 22 (e.g., dirt, grain of rice, piece of debris) or a collection of objects 22, as a dirty floor area 12 of the floor surface 10, across a series of captured images 514. The image analysis system 400 may analyze the image 514 for portions having some characteristic different from its surrounding portions for identifying objects 22. For example, the image analysis system 400 may identify an object 22 by comparing its color, size, shape, surface texture, etc. with respect to its surroundings (background). The image analysis system 400 may identify objects 22 from 0.5 meters away while driving at 30 cm/sec, for example. This allows the robot 100 time for path planning and reacting to detected objects 22, and/or executing a behavior or routine noticeable to a viewer (e.g., providing an indication that the robot 100 has detected an object or debris 22 and is responding accordingly).

The sensor system 500 may include a debris sensor 520 (FIG. 3) disposed in a pathway 161 of the cleaning system 160 (e.g., between a cleaning head 162 and the bin 163) and/or in the bin 163. The debris sensor 520 may be an optical break-beam sensor, piezoelectric sensor or any other type of sensor for detecting debris passing by. Details and features on debris detectors and other combinable features with this disclosure can be found in United States Patent Application Publication 2008/0047092, which is hereby incorporated by reference in its entirety.

In some implementations, reasoning or control software, executable on the controller 150 (e.g., on a computing processor), uses a combination of algorithms executed using various data types generated by the sensor system 500. The reasoning software processes the data collected from the sensor system 500 and outputs data for making navigational decisions on where the robot 100 can move without colliding with an obstacle, for example. By accumulating imaging data over time of the robot's surroundings, the reasoning software can in turn apply effective methods to selected segments of the sensed image(s) to improve measurements of the image sensor 510. This may include using appropriate temporal and spatial averaging techniques.

The bumper 130 may include one or more bump sensors 514 (e.g., contact sensor, switch, or infrared proximity sensor) for sensing contact with a bumped object. In some examples, the bumper 130 includes right and left bump sensors 514a, 514b for sensing a directionality of the bump with respect to the forward drive direction (e.g., a bump vector).

With continued reference to FIG. 4, in some implementations, the robot 100 includes a navigation system 600 configured to allow the robot 100 to navigate the floor surface 10 without colliding into obstacles or falling down stairs and to intelligently recognize relatively dirty floor areas 12 for cleaning. Moreover, the navigation system 600 can maneuver the robot 100 in deterministic and pseudo-random patterns across the floor surface 10. The navigation system 600 may be a behavior based system stored and/or executed on the robot controller 150. The navigation system 600 may communicate with the sensor system 500 to determine and issue drive commands to the drive system 120.

Figure 5:
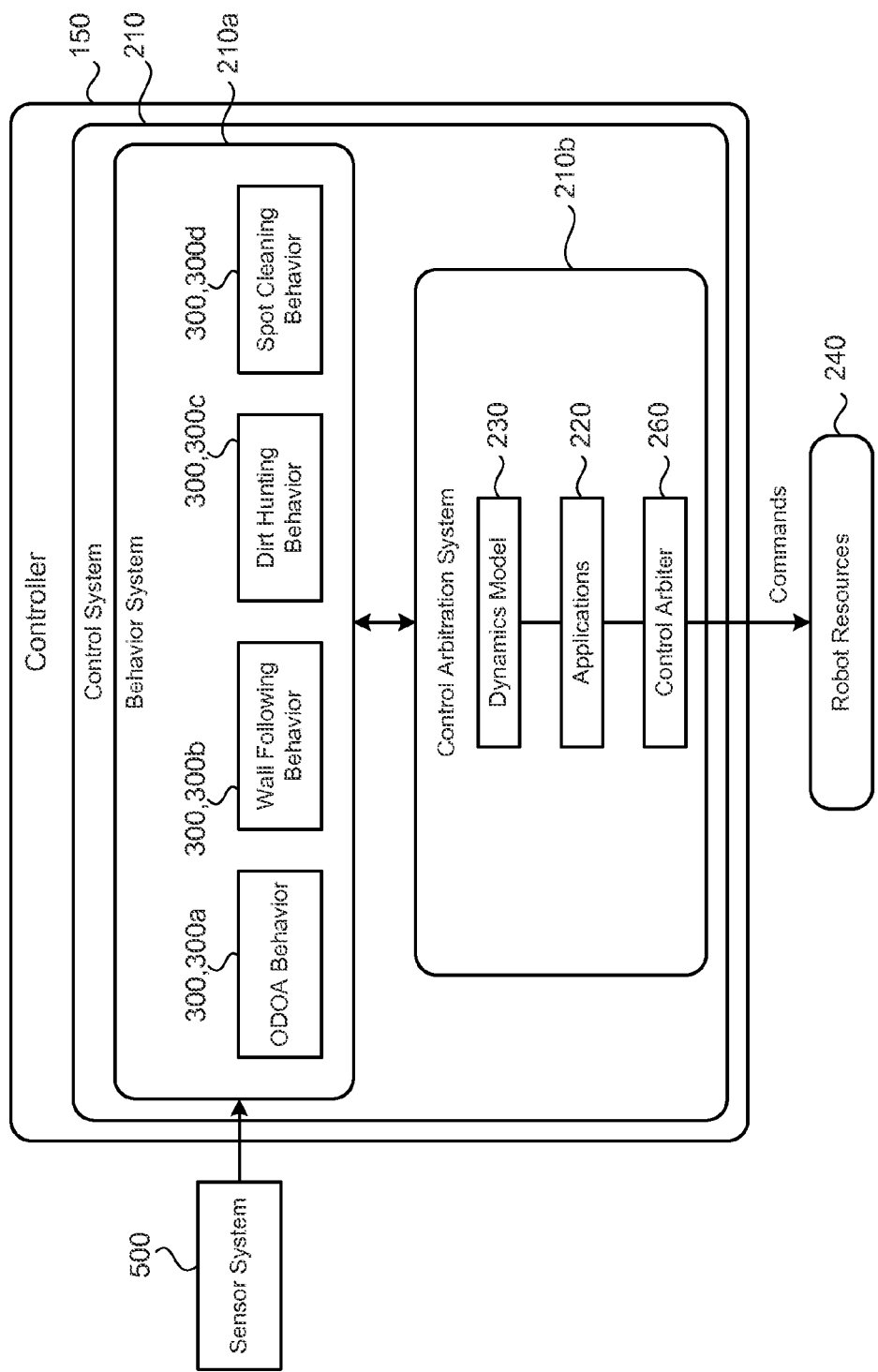
FIG. 5 is a schematic view of an exemplary controller for a mobile floor cleaning robot.
Figure 6:
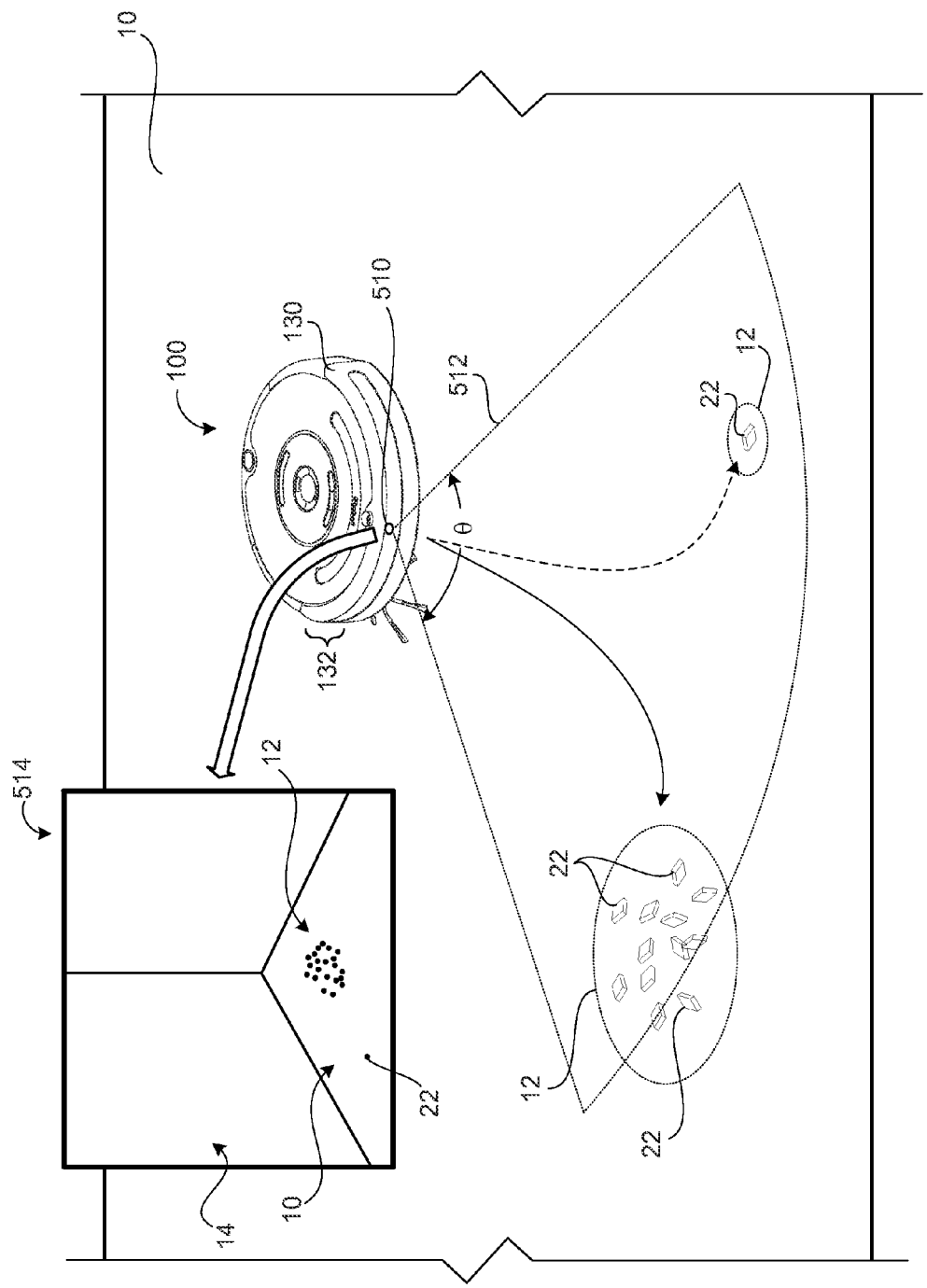
FIG. 6 provides a perspective view of an exemplary mobile floor cleaning robot sensing dirt on a floor.

Referring to FIG. 5, in some implementations, the controller 150 (e.g., a device having one or more computing processors in communication with memory capable of storing instructions executable on the computing processor(s)) executes a control system 210, which includes a behavior system 210a and a control arbitration system 210b in communication with each other. The control arbitration system 210b allows robot applications 220 to be dynamically added and removed from the control system 210, and facilitates allowing applications 220 to each control the robot 100 without needing to know about any other applications 220. In other words, the control arbitration system 210b provides a simple prioritized control mechanism between applications 220 and resources 240 of the robot 100.

The applications 220 can be stored in memory of or communicated to the robot 100, to run concurrently on (e.g., on a processor) and simultaneously control the robot 100. The applications 220 may access behaviors 300 of the behavior system 210a. The independently deployed applications 220 are combined dynamically at runtime and to share robot resources 240 (e.g., drive system 120 and/or cleaning systems 160, 160a, 160b). A low-level policy is implemented for dynamically sharing the robot resources 240 among the applications 220 at run-time. The policy determines which application 220 has control of the robot resources 240 as required by that application 220 (e.g. a priority hierarchy among the applications 220). Applications 220 can start and stop dynamically and run completely independently of each other. The control system 210 also allows for complex behaviors 300 which can be combined together to assist each other.

The control arbitration system 210b includes one or more application(s) 220 in communication with a control arbiter 260. The control arbitration system 210b may include components that provide an interface to the control arbitration system 210b for the applications 220. Such components may abstract and encapsulate away the complexities of authentication, distributed resource control arbiters, command buffering, coordinate the prioritization of the applications 220 and the like. The control arbiter 260 receives commands from every application 220 generates a single command based on the applications' priorities and publishes it for its associated resources 240. The control arbiter 260 receives state feedback from its associated resources 240 and may send it back up to the applications 220. The robot resources 240 may be a network of functional modules (e.g., actuators, drive systems, and groups thereof) with one or more hardware controllers. The commands of the control arbiter 260 are specific to the resource 240 to carry out specific actions. A dynamics model 230 executable on the controller 150 is configured to compute the center for gravity (CG), moments of inertia, and cross products of inertial of various portions of the robot 100 for the assessing a current robot state.

In some implementations, a behavior 300 is a plug-in component that provides a hierarchical, state-full evaluation function that couples sensory feedback from multiple sources, such as the sensor system 500, with a-priori limits and information into evaluation feedback on the allowable actions of the robot 100. Since the behaviors 300 are pluggable into the application 220 (e.g. residing inside or outside of the application 220), they can be removed and added without having to modify the application 220 or any other part of the control system 210. Each behavior 300 is a standalone policy. To make behaviors 300 more powerful, it is possible to attach the output of multiple behaviors 300 together into the input of another so that you can have complex combination functions. The behaviors 300 are intended to implement manageable portions of the total cognizance of the robot 100.

In the example shown, the behavior system 210a includes an obstacle detection/obstacle avoidance (ODOA) behavior 300a for determining responsive robot actions based on obstacles perceived by the sensor (e.g., turn away; turn around; stop before the obstacle, etc.). Another behavior 300 may include a wall following behavior 300b for driving adjacent a detected wall (e.g., in a wiggle pattern of driving toward and away from the wall).

Referring to FIGS. 6-8B, while maneuvering across the floor surface 10, the robot 100 may identify objects 22 or dirty floor areas 12 (e.g., a collection of objects 22) using the image analysis system 400 and alter its drive path (e.g., veer off an initial drive path) to drive over and ingest the object(s) 22 using the cleaning system 160. The robot 100 may use the image analysis system 400 in an opportunistic fashion, by driving toward objects 22 or dirty floor areas 12 after identification. In the example shown in FIG. 6, the robot 100 identifies an object 22 on the floor 10 as well as a collection of objects 22 and corresponding dirty floor areas 12. The robot 100 may decide to drive toward one and then back toward the other in order to clean the floor surface 10.

Figure 7:
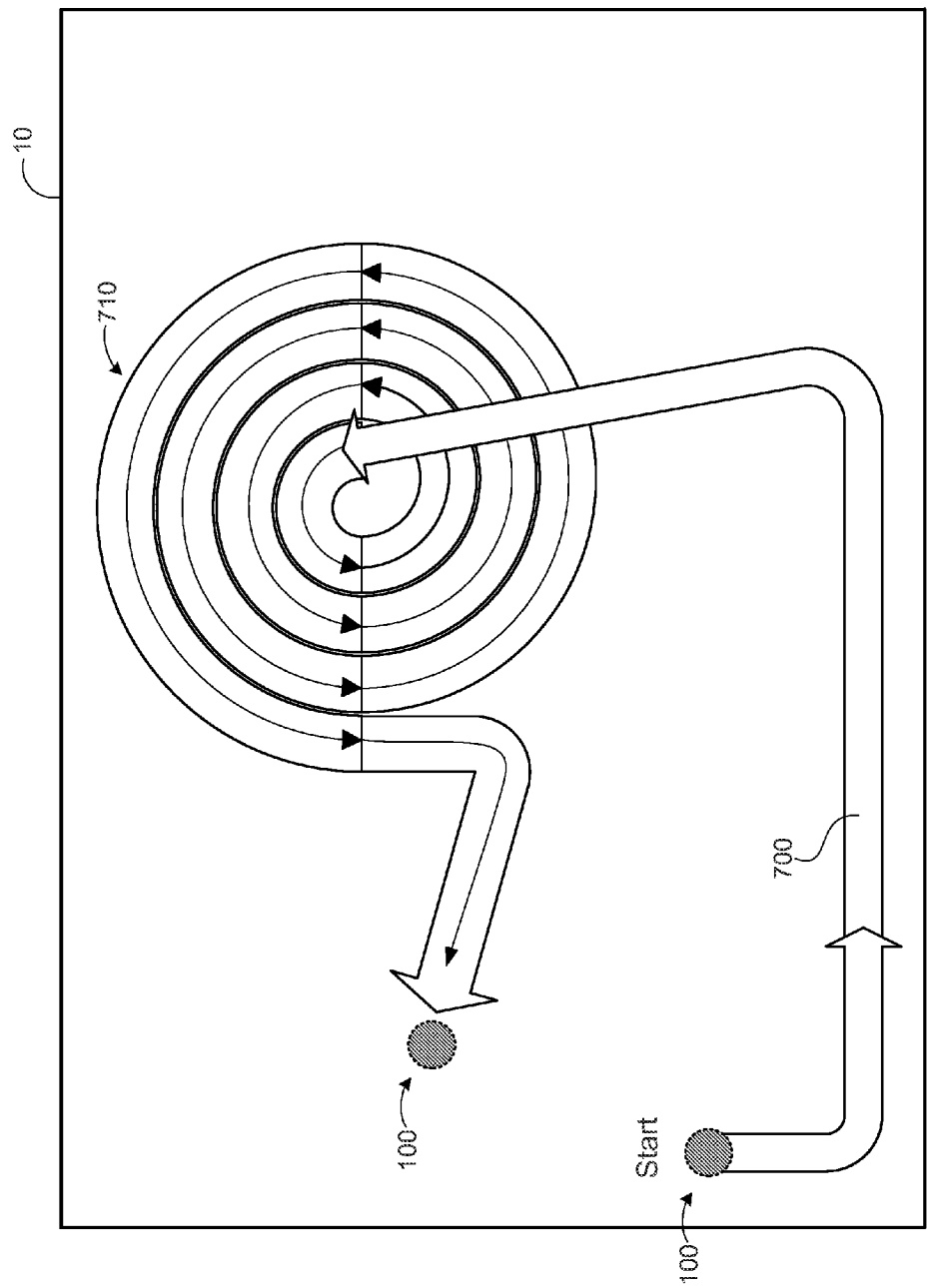
FIG. 7 is a schematic view of an exemplary spiraling cleaning pattern drivable by a mobile floor cleaning robot.
Figure 8A:
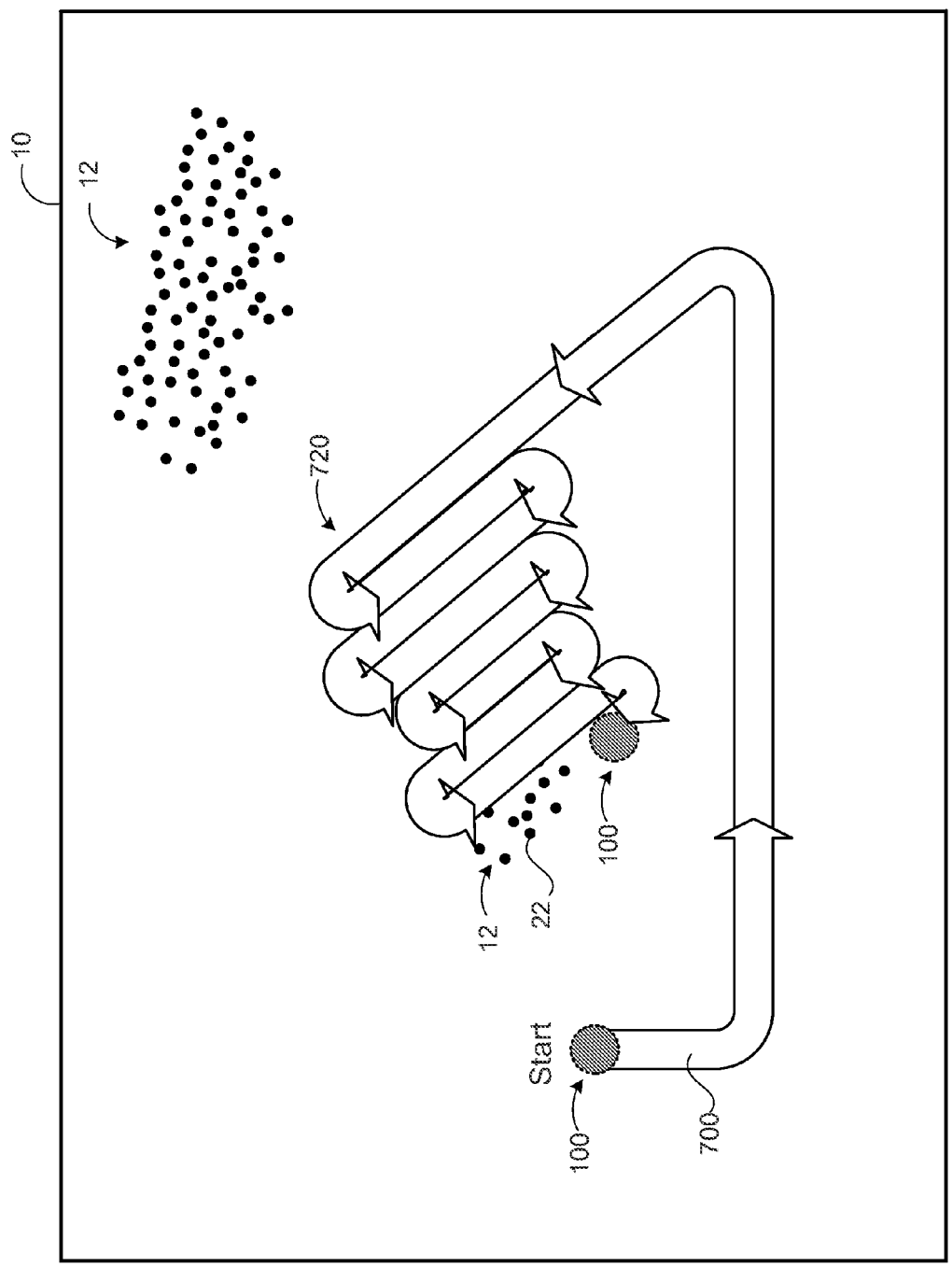
FIG. 8A is a schematic view of an exemplary parallel swaths cleaning pattern drivable by a mobile floor cleaning robot.
Figure 8B:
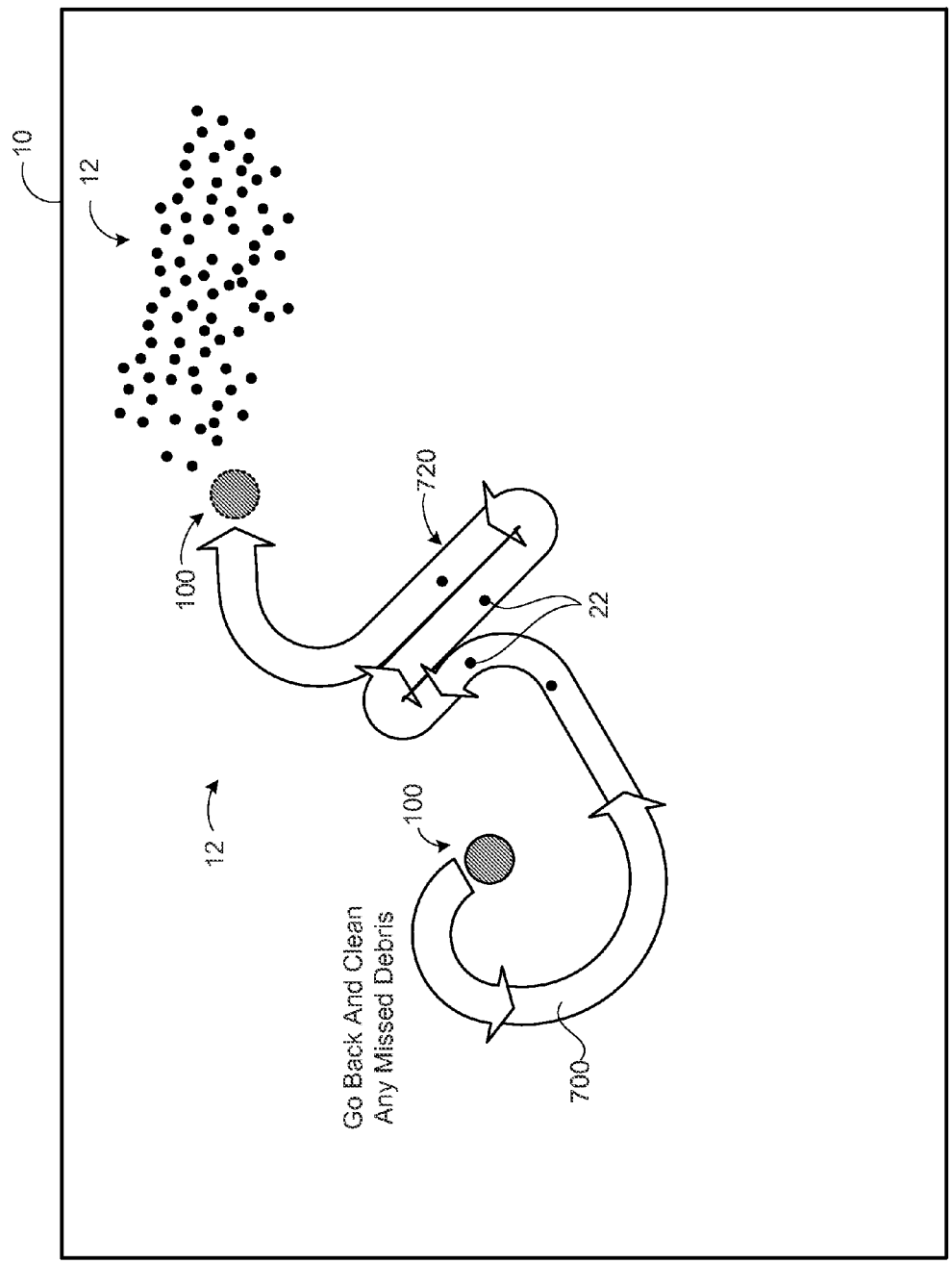
FIG. 8B is a schematic view of an exemplary mobile floor cleaning robot maneuvering to ingest identified debris in previously covered floor area.

In some examples, as the robot 100 cleans a surface 10, it detects a dirty location 12 as having a threshold level of dirt, fluid, or debris (e.g., noticeable by human visual inspection) as it passes over the location. A spot cleaning behavior 300c may cause the robot 100 to drive in a spiraling pattern 710 about the detected dirty location 12 as shown in FIG. 7. In some examples, the spot cleaning behavior 300c causes the robot 100 to follow a parallel swaths (cornrow) pattern 720, as shown in FIG. 8A. In some examples, the swaths are not parallel and may overlap when the robot is turning at a 180°. The pattern may include a back-and-forth movement similar to the way a person cleans with an upright vacuum. While turning ~360 degrees at the end of each row, the camera(s) 510 and any other sensor e.g., a ranging sensor) of the sensor system 500 acquire sensor data (e.g., while their corresponding fields of view sweep with the turn) of the environment about the robot 100. The controller 150 may use this data for localization, mapping, path planning and/or additional debris/object detection. Moreover, as the robot 100 executes the spot cleaning behavior 300c, it may deviate from the drive path (i.e., veer off course) to drive over any recognized debris 22 and then return to the drive path or drive off according to another behavior 300.

As shown in FIG. 89, the robot 100 may maneuver back over a previously traversed area to ingest debris 22 missed on the previous pass. Using the image analysis system 400, the robot 100 may determine a drive path that goes over each identified missed debris 22 or execute the spot cleaning behavior 300c again in that location, for example, by driving in a corn row pattern.

Figure 9A:
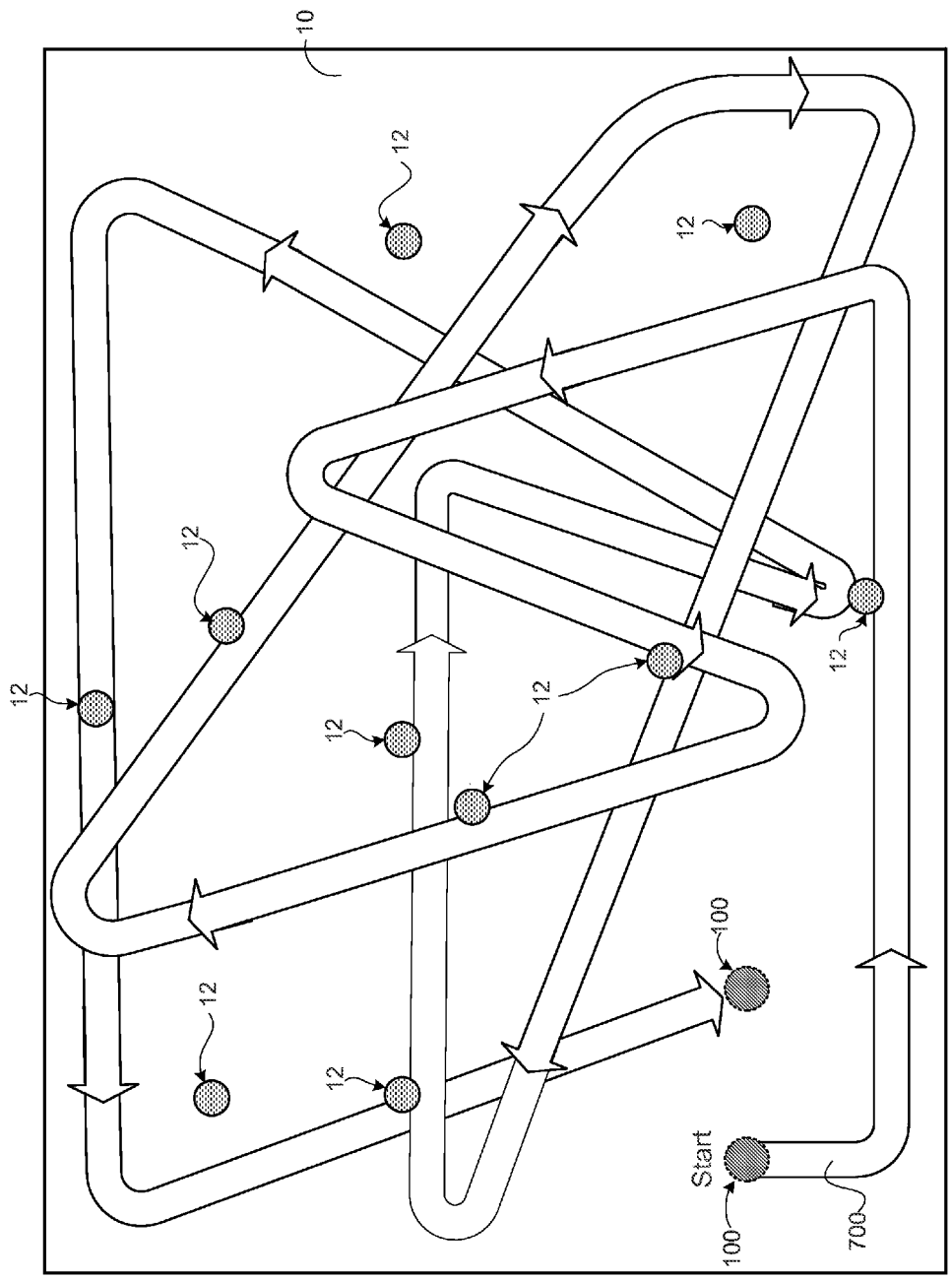
FIG. 9A is a schematic view of an exemplary cleaning path drivable by a mobile floor cleaning robot.
Figure 9B:
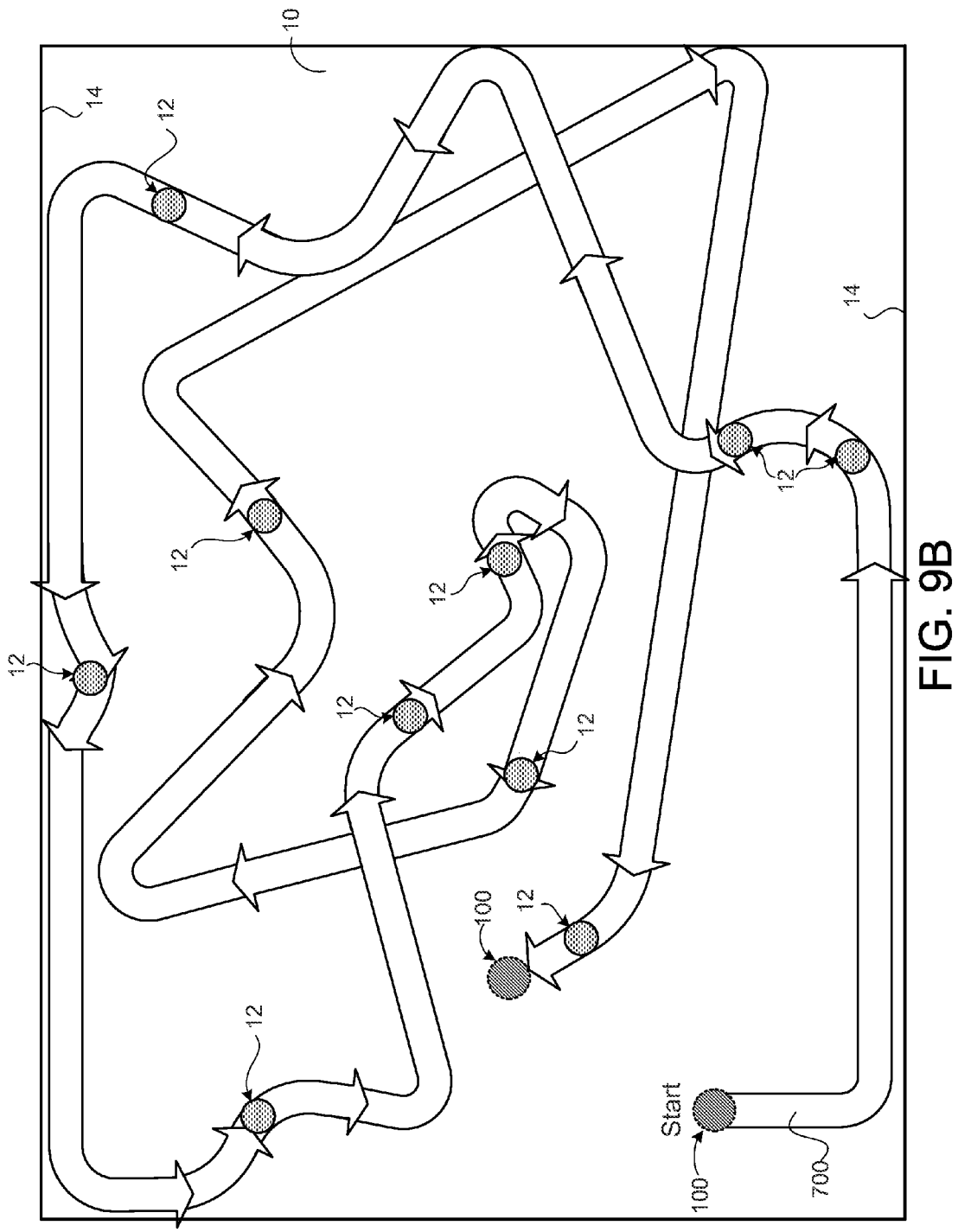
FIG. 9B is a schematic view of an exemplary cleaning path drivable by a mobile floor cleaning robot, as the robot locates dirty floor areas.
Figure 9C:
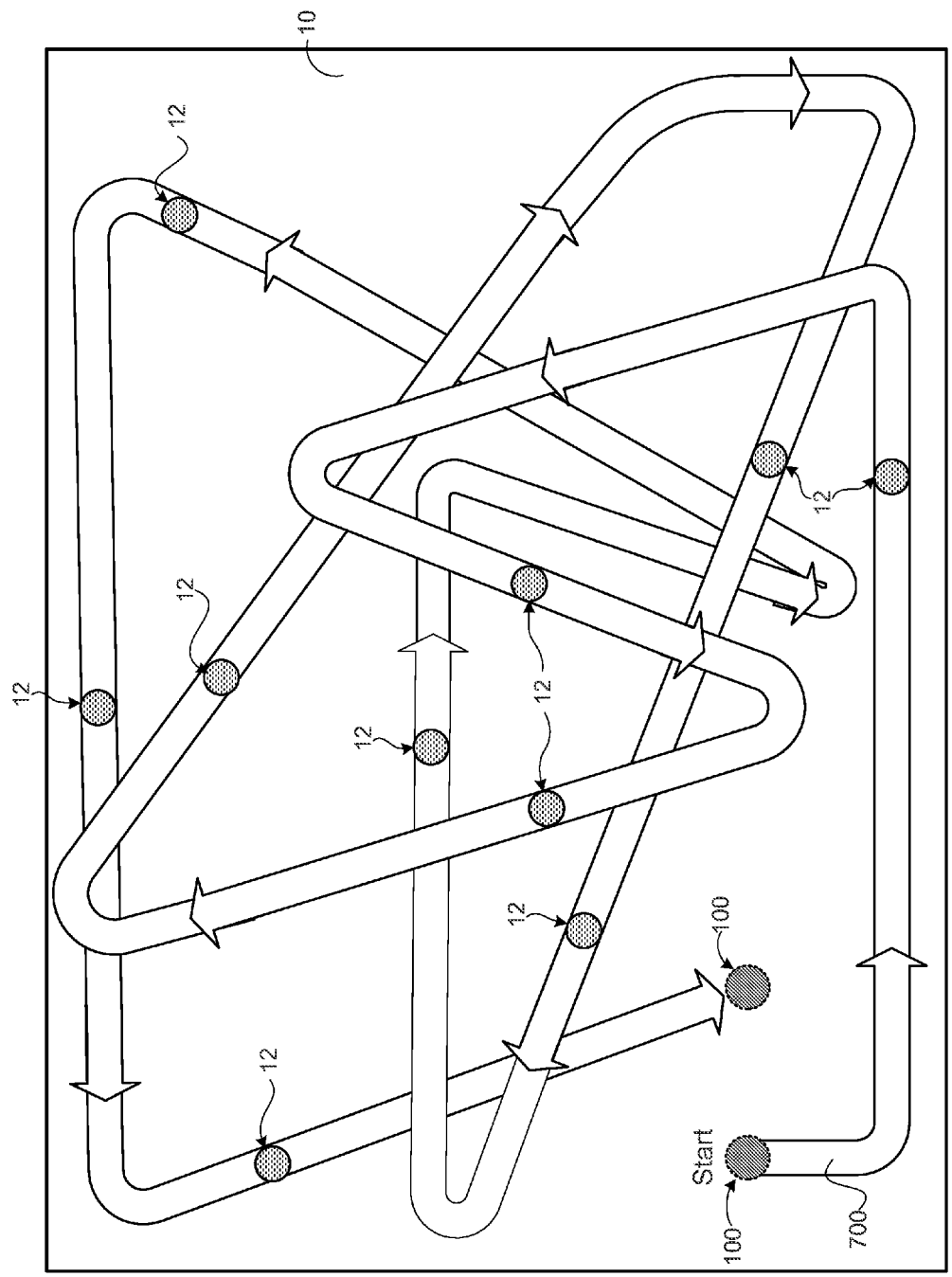
FIG. 9C is a schematic view of an exemplary cleaning path drivable by a mobile floor cleaning robot according to a planned path based on identified dirty floor areas.

Referring to FIGS. 9A-9C, in some implementations, the robot 100 drives about the floor surface 10 according to one or more behaviors 300, for example, in a systematic or unsystematic manner. The robot 100 may drive over and ingest debris 22 of dirty floor areas 12 without any look ahead detection of the debris 22, as shown in FIG. 9A. In this case, the robot 100 cleans some dirty floor areas 12, while leaving others. The robot 100 may execute a dirt hunting behavior 300d that causes the robot 100 to veer from its driving/cleaning path 700 and maneuver towards a dirty location 12, identified using the sensor system 500 of the robot 100 (e.g., using the imaging sensor(s) 510). The dirt hunting behavior 300d and the spot cleaning behavior 300c may act in accord: the dirt hunting behavior 300d tracks dirty locations 12 around the robot 100, and the spot cleaning behavior 300c looks for dirty locations 12 under the robot 100 as it passes over a floor surface 10.

In the example shown in FIG. 9B, while driving according to an issued drive command, the robot 100 may detect debris 22 and a corresponding dirty floor area 12 using the image analysis system 400 and the sensor system 500. The dirt hunting behavior 300d may cause the robot 100 to veer from its driving/cleaning path 700 and maneuver toward an identified dirty floor area 12 and then return to its driving/cleaning path 700. By cleaning the identified dirty floor area 12 in this opportunistic fashion, the robot 100 can clean the floor 10 relatively more effectively and efficiently, as opposed to trying to remember the location of the dirty floor area 12 and then return on a later pass. The robot 100 may not return to the exact same location, due to location drift or poor mapping. Moreover, the opportunistic dirt hunting allows the robot 100 to detect and clean debris 22 from the floor 10 while executing a combination of behaviors 300. For example, the robot 100 may execute a wall following behavior 300b and the dirty hunting behavior 300c on the controller 150. While driving alongside a wall 14 (e.g., driving adjacent the wall 14 by an offset distance) according to the wall following behavior 300b, the robot 100 may identify apiece of debris 22 and a corresponding dirty floor area 12 using the dirty hunting behavior 300c, which may cause the robot 100 to temporarily deviate away from the wall 14 to clean the identified dirty floor area 12 and then resume the wall following routine or execute another behavior 300.

Referring to FIG. 9C, in some implementations, the robot 100 may recognize multiple dirty floor areas 12 using the image analysis system 400 (e.g., while driving or rotating in spot), and the dirt hunting behavior 300d may cause the controller 150 to execute a path planning routine to drive to each identified dirty floor area 12 and ingest debris 22 using the cleaning system 160. Moreover, the controller 150 (e.g., via the image analysis system 400) may track locations of dirty floor areas 12 (e.g., store floor locations in memory or on a map in memory) while executing quick passes over them and then execute one or more drive commands to return to each identified dirty floor areas 12 for further cleaning.

Figure 10:
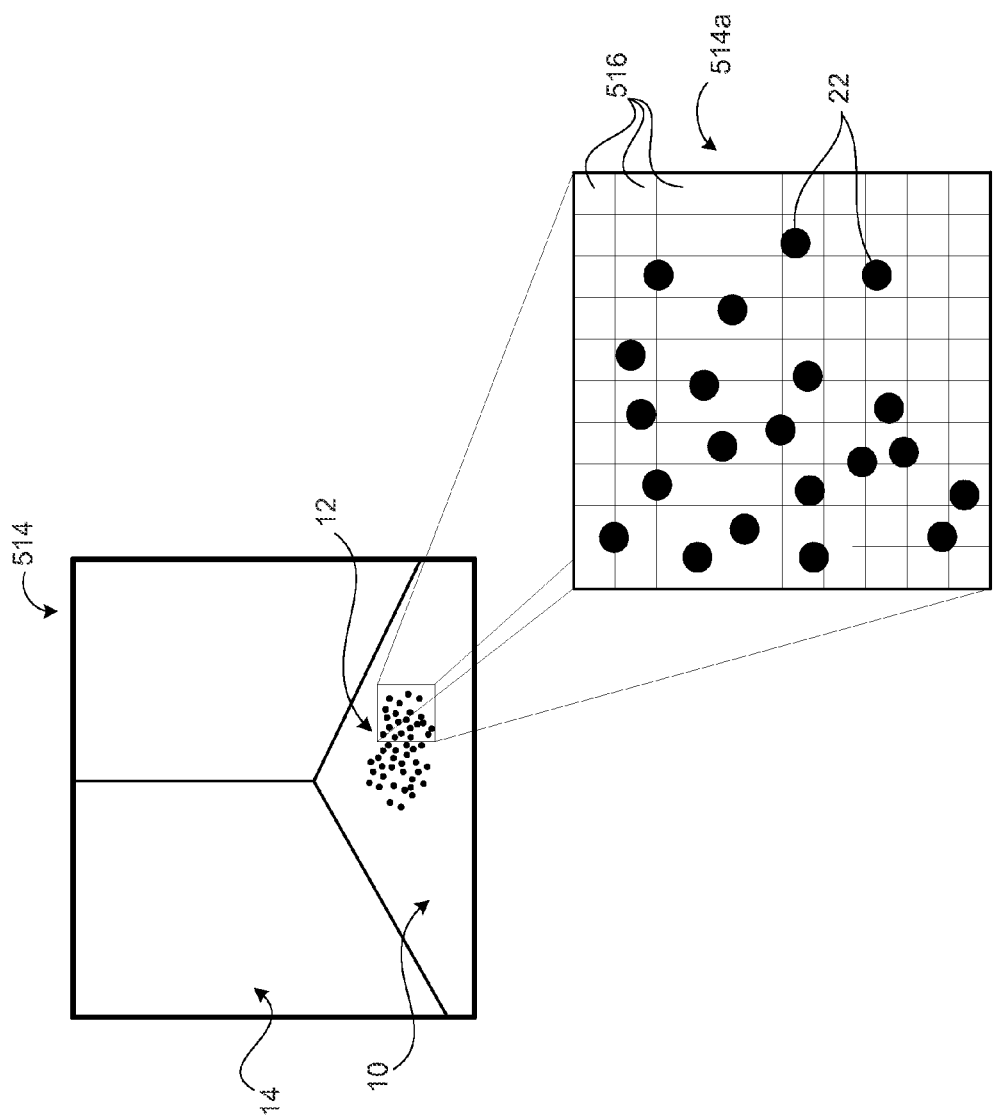
FIG. 10 is a schematic view of an exemplary image captured by a camera on a mobile floor cleaning robot, with an enlarged portion of the image showing the pixels of the image.

Referring to FIG. 10, the controller 150 receives sensor signals having image data from the imaging sensor(s) 510. A digital image 514 is composed of an array of pixels 516. A pixel 516 is generally considered the smallest element of a digital image 514, and is associated with a numerical representation of its color in a color space, RGB is one of the most common color models where red, green, and blue light are added together in different quantities to produce a broad range of different colors. The color of each pixel 516 is therefore represented with three values, each value representing one of the red, green, and blue coordinate. The number of colors an image is able to display depends on the number of bits per pixel. For example, if an image is 24 bits per pixel, it is a "true color" image and can display $2^{24}$=16,777,216 different colors. If an image is 16 bits, it is a "high color" image and can display $2^{16}$=65,536 colors. (8-bit image can display $2^8$=256 colors, and 4 bit image can display $2^4$=16 colors). Another example of color space is the LAB color space which has three dimensions, one for lightness L and two for color-components. The LAB color space contains all possible colors; therefore has a greater color range than RGB. FIG. 10 shows a captured image 514 and an enlarged portion 514a of the captured image 514 showing an array of pixels 516.

Figure 11:
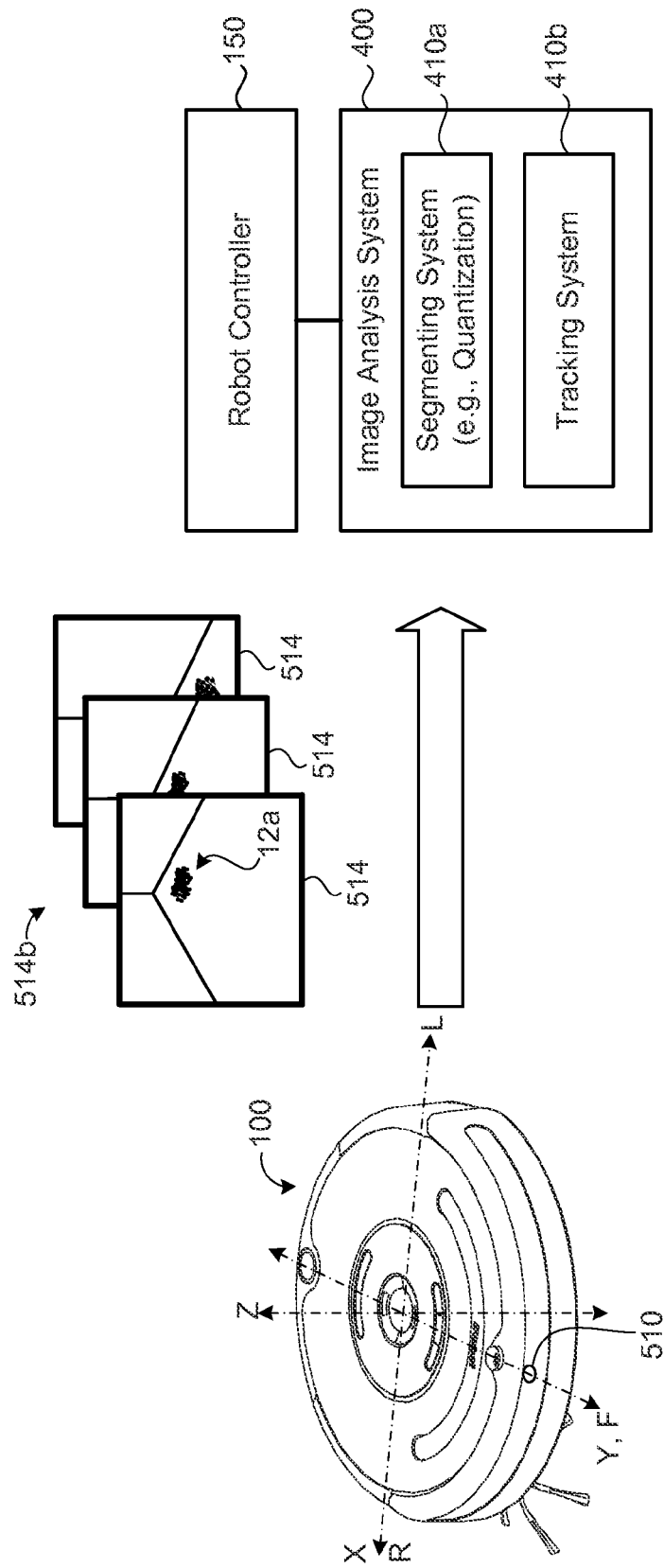
FIG. 11 is a schematic view an image analysis system receiving images from a mobile floor cleaning robot.

Referring to FIGS. 11 and 12, the controller 150 may receive a sequence of images 514b of the floor surface 10 captured by the imaging sensor(s) 510. The imaging sensor(s) 510 may capture the sequence of images 514b at a constant interval of time ranging from one frame per second to 30 frames per second. Other time intervals are possible as well. In some examples, the imaging sensor 510 is a video camera that captures a series of still images 514 which represent a scene. A video camera increases the number of images 514 used for analysis, and therefore may require more memory space to analyze the images 514. Each image 514 is divided into an upper portion 514u and a lower portion 514l. Since the imaging sensor 510 is located on the robot body 110, most images 514 captured include the floor surface 10 in the lower portion 514l of the image 514, and a wall 14 or other unrelated objects in the upper portion 514u of the image 514.

Referring back to FIG. 4, in some implementations, the image analysis system 400 includes a segmenting system 410a and a tracking system 410b. The image analysis system 400 may be part of the robot controller 150, part of the imaging sensor 510, or operate as a separate system. Moreover, the segmenting system 410a and the tracking system 410b may be separate systems. For example, the segmenting system 410a may be part of the imaging sensor 510 and the tracking system 410b may be part of the robot controller 150.

The segmenting system 410a analyzes (e.g., color quantizes) pixels 516 of the image 514 to reduce the number of colors used in the captured image 514. Raw captured video images have a tremendous amount of data that may be useless in some image analysis applications. One method of reducing the data associated with an image 514 is quantization. Quantization is a process used to reduce the image data values by taking a range of image values and converting the range of values to a single value. This process creates a reduced image file size (e.g., for an image with a certain number of pixels) which is relatively more manageable for analysis. The reduced image file size is considered to be lossy since video image information has been lost after the quantization process. Therefore, the analysis of a compressed image requires less memory and less hardware.

Color quantization is a similar process which reduces the number of colors in an image without distorting the image 514, also to reduce the image file size required for storing and for bandwidth transmission of the image 514. Color quantization is generally used for displays supporting a certain number of colors. Color quantization may reduce a color set of $256^3$ colors to a smaller color set of $8^3$. RGB is a color model where red, green, and blue light are added together in different quantities to produce a broad range of different colors. The robot 100 may use RGB color space for color quantization. The robot 100 may use other color spaces requiring more intensive computation and resulting in better image segmentation, like LAB. The controller 150 may assign a numerical representation for the color of each pixel 516 in a color space (e.g., a pixel at location (5, 5) within the captured image 514 may have a color of (213, 111, 56), where 213 represents Red, 111 represents Green and 56 represents Blue). If the numerical representation of the RGB colors is the maximum number within the range, the color of the pixel 516 is white which represents the brightest color. If the numerical value of the RGB representation is zero for all the color channels, then the color is black (e.g., (0, 0, 0)). The segmenting system 410a may quantize the image pixels 516 in a red-green-blue color space, reducing the image 514 to a 9-bit red-green-blue image, or in some other color space, such as a LAB color space. The segmenting system 410a may reduce the image 514 to between a 6 bit and a 12 bit image 514. Other reductions are possible as well.

The segmenting system 410a may quantize the pixels 516 using bit shifting operations to quickly convert each pixel from an original color space to a smaller color space (e.g., color set of $256^3$ colors or 24-bit RGB to a smaller color set of $8^3$ colors or 9-bit RGB). Bit shifting is a quick process supported by the controller 150 to change specified values to perform faster calculations. In some examples, the bit shifting operation keeps the three most-significant bits (MSB) of each channel (RGB). Other bit shifting operations may be used. In some implementations, if the controller 150 is not limited in size (e.g., processing capability), the quantization stage may not require bit shifting and may perform calculations like division, multiplication, and addition. Color blobs 12a made by bit shifting is relatively fast, computationally on a processor, and allows the robot 100 to identify/find an explicit color blob 12a by looking tier colors that match a tight distribution.

While quantizing the color of a pixel 516, the segmenting system 410a may use the (x, y) location of the pixel 516 within the image 514 to update statistics needed to compute a spatial distribution for each of the quantized colors. Therefore, the segmenting system 410a determines a spatial distribution of each color of the image 514 based on the corresponding pixel locations (x, y). In some implementations, the segmenting stage 410a finds small bias 12a implicitly by checking the list of colors for areas with a threshold spatial distribution calculated using a standard deviation, range, mean deviation, or other calculation. This approach does not rely on any fine-grained image features, like edges; therefore, it is robust to motion blur and variations in lighting conditions. A blob 12a may be any connected region of an image 514, such as a region having the same color, texture, and/or pattern.

In some implementations, the segmenting stage 410a explicitly calculates spatial patterns. Such algorithms for spatial patterns are more costly and require more processing and storage space than without such algorithms. In some examples, the segmenting system 410a segments the captured image 514 without quantizing the captured image 514 first; therefore, the spatial distribution is calculated using the original color space of the image 514. Referring to FIG. 12A, in some implementations, only those pixels 516 in the lower portion 514*l* of the acquired image 514 that may correspond to nearby parts of the floor 10 are processed. The controller 150 may ignore pixels 516 near the center of the image 514 (horizontally) under an assumption that any centrally located blobs 12*a* may have little impact on the behavior of the robot 100. Referring to FIG. 12B, the controller 150 may break the processed parts of the acquired image 514 into rectangular regions 514*r* so that more than one blob 12*a* of the same color can be found.

After the robot 100 quantizes the acquired image 514, resulting in an image 514 with relatively less colors and more prominent salient blobs 12*a*, the tracking stage begins. The tracking system 410*b* tracks a location of the color blobs 12*a* with respect to the imaging sensor 510 across a sequence 514*b* of images 514. Tracking a location of the color blobs 12*a* may include determining a velocity vector (e.g., the change of the distance/the change of time calculated between successive image captures at t=0 and t=1 of each color blob 12*a* with respect to the imaging sensor 510; and recording determined color blob locations for each image 514 of the image sequence 514*b*. In some examples, the controller 150 determines a size of each color blob 12*a*. The tracking system 410I) may use straightforward linear extrapolation based on the estimated velocity of a blob 12*a* relative to the moving camera 510. Extrapolation is a process that uses known values (e.g., location of pixel (x, y)) and estimates a value outside the known range. Extrapolation assumes that the estimated values outside the known range rationally follow the known values.

FIGS. 13A-13C illustrates captured images 514 as the robot 100 tracks a dirt blob 12*a* over a period of time while maneuvering across the floor surface 10 or while approaching the dirt blob 12*a* to clean the corresponding floor surface 10. By tracking system 410*b* the blobs 12*a* over a period of time, the robot 100 can maneuver towards the dirt blobs 12*a* to clean them.

As the tracking system 410*b* tracks the dirt blob 12*a*, the controller 150 issues a drive command to maneuver the robot 100 based on the location (x, y) of one or more blobs 12*a*. The drive command may maneuver the robot 100 towards the nearest color blob 12*a* (e.g., while veering away from a previous drive command and optionally returning). In some examples, the controller 150 identifies the nearest color blob 12*a* in a threshold number of images 514 of the image sequence 514*b*. In some examples, the controller 150 determines a size of each blob and a velocity vector V of each blob 12*a* with respect to the imaging sensor 510. The controller 150 issues a drive command to maneuver the robot 100 based on the size and the velocity vector V of one or more color blobs 12*a*. The controller 150 may issue a drive command to maneuver the robot 100 towards a color blob 12*a* having the largest size and velocity vector V toward the robot 100 (e.g., relative to any other blobs 12*a* in the image sequence 514*a*). In some examples, the controller 150 executes a heuristic related to blob size and blob speed to filter out blobs 12*a* non-indicative of debris 22 on the floor surface 10 (FIG. 5). In some implementations, pieces of ingestible debris 22 may have roughly uniform color concentration in a small part of the image 514. An approximate calibration of the camera 510 allows the tracking system 410*b* (e.g., executing an algorithm) to compute the size and location of the blob 12*a* in the real world, relative to the robot 100. Heuristics related to the size and speed of the debris 22 are then used to filter out likely false positives.

When a piece of debris 22 has many colors or a varied pattern, the image analysis system 400 may have difficulties recognizing or tracking the debris 22. In those cases, the controller may execute additional recognition behaviors 300 or routines and/or rely on additional sensor data from the sensor system 500. For example, the controller 150 may cause the robot 100 to drive toward an unrecognizable object to either ingest it with the cleaning system 160, drive over it, or bump into it to detect a bump event. Moreover, the controller 150 may execute additional behaviors 300 or routines that use the captured images 514 for robot operation. Examples include, but are not limited to, navigation, path planning, obstacle detection and obstacle avoidance, etc.

Figure 14:
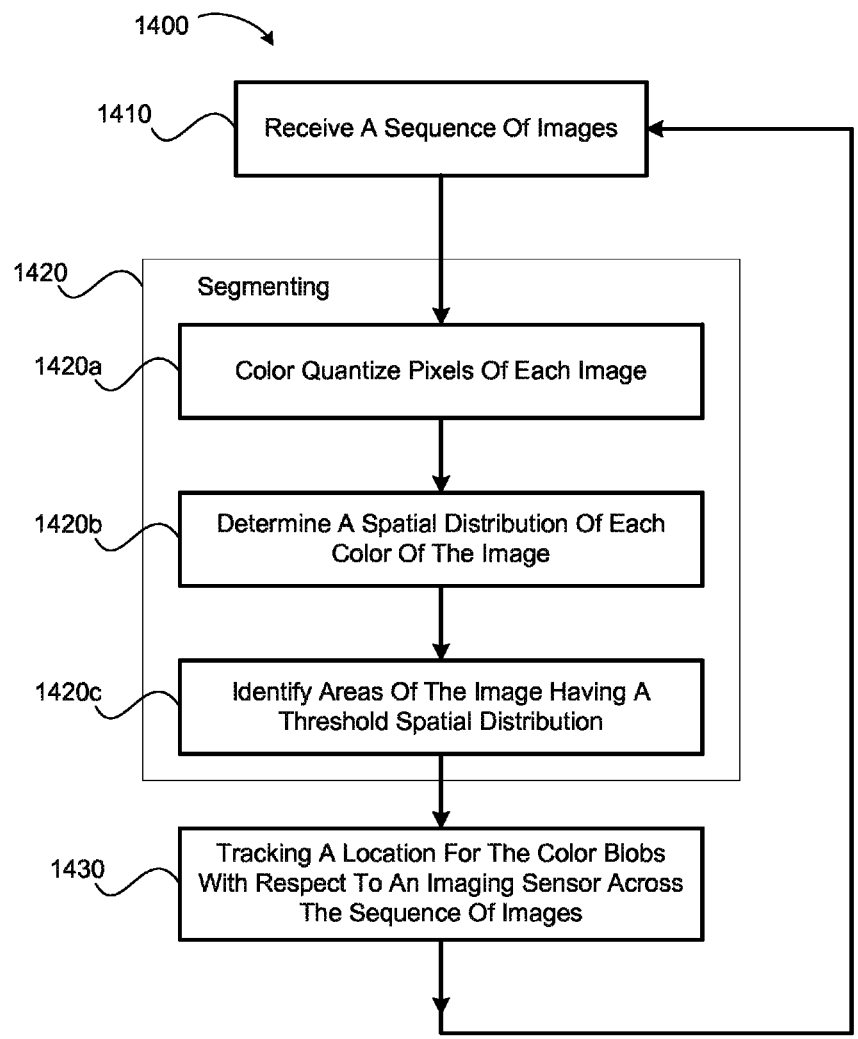
FIG. 14 is a schematic view of an exemplary arrangement of operations for operating the robot.

FIG. 14 provides an exemplary arrangement 1400 of operations for a method 1400 of operating a mobile cleaning robot 100 having an imaging sensor 510. The method includes receiving 1410 a sequence 514*b* of images 514 of a floor surface 10 supporting the robot 100, where each image 514 has an array of pixels 516. The imaging sensor 510 may be a video camera or a still camera. The method further includes segmenting 1420 each image 514 into color blobs 12*a* by: color quantizing 1420*a* pixels 516 of the image 514, determining 1420*b* a spatial distribution of each color of the image 514 based on corresponding pixel locations, and then for each image color, identifying 1420*c* areas of the image 514 having a threshold spatial distribution for that color. The method also includes tracking 1430 a location of the color blobs 12*a* with respect to the imaging sensor 510 across the sequence 514*b* of images 514.

The method may include identifying portions (e.g., one or more pixels 516) of an image 514 having a characteristic (e.g., color, shape, texture, or size) different from a surrounding background. The method may also include identifying those same image portions across a sequence 514*b* of images 514. The robot 100 may identify relatively small objects (e.g., grain of rice) for ingestion by the cleaning system 160 and relatively large objects (e.g., sock or furniture) for obstacle detection and avoidance.

In some examples, color quantizing 1420*a* pixels 516 applies in a tower portion 514*l* of the image 514 oriented vertically, and/or outside of a center portion 514*c* of the image 514. The step of segmenting 1420 the image 514 into color blobs 12*a* may include dividing the image 514 into regions 514*r* and separately color quantizing 1420*a* the pixels 516 of each region 514*r*. The multiple image regions 514*r* allow the robot 100 to analyze different blobs 12*a* in different regions 514*r* of the image 514, allowing the robot 100 to track more than one blob 12*a*. In some examples, the method 1400 includes executing a bit shifting operation to convert each pixel 516 from a first color set to second color set smaller than the first color set. The bit shifting operation may retain the three most significant bits of each of a red, green and blue channel.

In some examples, the image sensor 510 comprises a camera arranged to have a field 512 of view along a forward drive direction F of the robot 100. The method may include scanning the camera side-to-side or up-and-down with respect to the forward drive direction F of the robot 100.

Tracking 1430 a location of the color blobs 12*a* may include determining a velocity vector V of each color blob 12*a* with respect to the imaging sensor 510, and recording determined blob locations for each image 514 of the image sequence 514*b*. In some examples, the method includes determining a size of each color blob 12*a*. The method may include issuing a drive command to maneuver the robot 100 based on the location of one or more blobs 12*a* and/or to maneuver the robot 100 toward a nearest blob 12*a*. The nearest blob 12*a* may be identified in a threshold number of images 514 of the image sequence 514*b*.

In some examples, the method 1400 includes determining a size of each blob 12*a*, determining a velocity vector V of each blob 12*a* with respect to the imaging sensor 510, and issuing a drive command to maneuver the robot 100 based on the size and the velocity vector V of one or more blobs 12*a*. The drive command may be issued to maneuver the robot 100 towards a blob 12*a* having the largest size and velocity vector V toward the robot 100. The method may further include executing a heuristic related to blob size and blob speed to filter out blobs 12*a* non-indicative of debris 22 on the floor surface 10.

In some examples, the method includes assigning a numerical representation for the color of each pixel 516 in a color space (e.g., a pixel at location (5, 5) within the captured image 514 may have a color of (213, 111, 56), where 213 represents Red, 111 represents Green and 56 represents Blue). The color quantizing 1420*a* of the image 514 pixels 516 may be in a red-green-blue color space, reducing the image to a 9-bit red-green-blue image or in a LAB color space.

Referring back to FIG. 6, the method 1400 may further include executing a control system 210 having a control arbitration system 210*b* and a behavior system 210*a* in communication with each other. The behavior system 210*a* executing a cleaning behavior 300*d*. The cleaning behavior 300*d* influencing execution of commands by the control arbitration system 210*b* based on the image segmentation 1420 to identify blobs 12*a* corresponding to a dirty floor area 12 and blob 12*a* tracking to maneuver over the dirty floor area 12 for cleaning using a cleaning system 160 of the robot 100.

The method may include executing a mapping routing on the robot controller 150 in response to a received sensor event for determining a local sensory perception of an environment about the robot 100. The mapping routine may classify the local perceptual space into three categories: obstacles, unknown, and known free. Obstacles may be observed (i.e., sensed) points above the ground that are below a height of the robot 100 and observed points below the ground (e.g., holes, steps down, etc.). Known free corresponds to areas where the sensor system 500 can identify the ground.

In some examples, the method includes executing a control system 210 on the robot controller 150. The control system 210 includes a control arbitration system 210*b* and a behavior system 210*a* in communication with each other. The behavior system 210*a* executes at least one behavior 300 that influences execution of commands by the control arbitration system 210*b* based on received sensor events from the sensor system 500. Moreover, the at least one behavior 300 may influence execution of commands by the control arbitration system 2101) based on sensor signals received from the robot sensor system 500.

Various implementations of the systems and techniques described here can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus", "computing device" and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (FDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:

1. A method of operating mobile floor cleaning robot, the method comprising:
   receiving, at a controller, a sequence of images of a floor surface from an imaging sensor in communication with the controller, each image having an array of pixels;
   for each image, segmenting the image into color blobs, using the controller, by:
   color quantizing pixels of the image;
   determining a spatial distribution of each color of the image based on corresponding pixel locations; and
   for each image color, identifying areas of the image having a threshold spatial distribution for that color;
   tracking, using the controller, a location of each color blob with respect to the imaging sensor across the sequence of images;
   identifying, using the controller, a location of an object on a floor surface away from the robot;
   issuing a first drive command from the controller to a drive system of the robot to drive the robot across the floor surface to clean the floor surface at the identified location of the object;
   determining, using the controller, whether the object persists on the floor surface; and
   when the object persists, issuing a second drive command from the controller to the drive system to drive the robot across the floor surface to re-clean the floor surface at the identified location of the object.

2. The method of claim 1, further comprising, after cleaning the floor surface at the identified object location, issuing a third drive command from the controller to the drive system to maneuver the robot to determine whether the object persists on the floor surface.

3. The method of claim 1, further comprising identifying the location of the object based on the tracked locations of the color blobs.

4. The method of claim 1, wherein segmenting the image into color blobs further comprises only color quantizing pixels in a lower portion of the image oriented vertically.

5. The method of claim 1, wherein segmenting the image into color blobs further comprises only color quantizing pixels outside of a center portion of the image.

6. The method of claim 1, wherein segmenting the image into color blobs further comprises dividing the image into regions and separately color quantizing the pixels of each region.

7. The method of claim 1, wherein segmenting the image into color blobs further comprises executing a bit shifting operation to convert each pixel from a first color set to second color set smaller than the first color set.

8. The method of claim 7, wherein the bit shifting operation retains the three most significant bits of each of a red, green and blue channel.

9. The method of claim 1, wherein tracking a location of each color blob comprises:
determining a velocity vector of each color blob with respect to the imaging; and
recording determined color blob locations for each image of the image sequence.

10. The method of claim 1, further comprising determining a size of each color blob.

11. The method of claim 1, further comprising issuing a third drive command from the controller to the drive system to maneuver the robot based on the location of one or more color blobs.

12. The method of claim 11, further comprising issuing a fourth drive command from the controller to the drive system to maneuver the robot toward a nearest color blob.

13. The method of claim 12, wherein the nearest color blob is identified in a threshold number of images of the image sequence.

14. The method of claim 1, further comprising:
determining, using the controller, a size of each color blob;
determining, using the controller, a velocity vector of each color blob with respect to the imaging sensor; and
issuing a third drive command from the controller to the drive system to maneuver the robot based on the size and the velocity vector of one or more color blobs.

15. The method of claim 14, further comprising issuing a fourth drive command from the controller to the drive system to maneuver the robot toward a color blob having the largest size and velocity vector toward the robot.

16. The method of claim 14, further comprising executing a heuristic related to color blob size and color blob speed to filter out color blobs non-indicative of debris on the floor surface.

17. The method of claim 1, further comprising assigning a numerical representation for the color of each pixel in a color space.

18. The method of claim 17, further comprising color quantizing the image pixels in a red-green-blue color space, reducing the image to a 9-bit red-green-blue image.

19. The method of claim 1, further comprising executing a control system having a control arbitration system and a behavior system in communication with each other, the behavior system executing a cleaning behavior, the cleaning behavior influencing execution of commands by the control arbitration system based on the image segmentation to identify color blobs corresponding to a dirty floor area and color blob tracking to maneuver over the dirty floor area for cleaning using a cleaning system of the robot.

20. A mobile floor cleaning robot comprising:
a robot body defining a forward drive direction;
a drive system supporting the robot body and configured to maneuver the robot over a floor surface;
a cleaning system supported by the robot body;
an imaging sensor disposed on the robot body; and
a controller in communication with the drive system and the imaging sensor, the controller:
receiving a sequence of images of the floor surface, each image having an array of pixels;
for each image, segmenting the image into color blobs by:
color quantizing pixels of the image;
determining a spatial distribution of each color of the image based on corresponding pixel locations; and
for each image color, identifying areas of the image having a threshold spatial distribution for that color; and
tracking a location of each color blob with respect to the imaging sensor across the sequence of images.

21. The mobile floor cleaning robot of claim 20, wherein segmenting the image into color blobs further comprises only color quantizing pixels in a lower portion of the image oriented vertically.

22. The mobile floor cleaning robot of claim 20, wherein segmenting the image into color blobs further comprises only color quantizing pixels outside of a center portion of the image.

23. The mobile floor cleaning robot of claim 20, wherein segmenting the image into color blobs further comprises dividing the image into regions and separately color quantizing the pixels of each region.

24. The mobile floor cleaning robot of claim 20, wherein segmenting the image into color blobs further comprises executing a bit shifting operation to convert each pixel from a first color set to second color set smaller than the first color set.

25. The mobile floor cleaning robot of claim 24, wherein the bit shifting operation retains the three most significant bits of each of a red, green and blue channel.

26. The mobile floor cleaning robot of claim 20, wherein the image sensor comprises a camera arranged to have a field of view along a forward drive direction of the robot.

27. The mobile floor cleaning robot of claim 26, wherein the camera scans side-to-side or up-and-down with respect to the forward drive direction of the robot.

28. The mobile floor cleaning robot of claim 20, wherein tracking a location of the color blobs comprises:
determining a velocity vector of each color blob with respect to the imaging; and
recording determined color blob locations for each image of the image sequence.

29. The mobile floor cleaning robot of claim 20, wherein the controller determines a size of each color blob.

30. The mobile floor cleaning robot of claim 20, wherein the controller issues a drive command to maneuver the robot based on the location of one or more color blobs.

31. The mobile floor cleaning robot of claim 30, wherein the controller issues a drive command to maneuver the robot toward a nearest color blob.

32. The mobile floor cleaning robot of claim 31, wherein the controller identifies the nearest color blob in a threshold number of images of the image sequence.

33. The mobile floor cleaning robot of claim 20, wherein the controller:
   determines a size of each color blob;
   determines a velocity vector of each color blob with respect to the imaging sensor; and
   issues a drive command to maneuver the robot based on the size and the velocity vector of one or more color blobs.

34. The mobile floor cleaning robot of claim 33, wherein the controller issues a drive command to maneuver the robot toward a color blob having the largest size and velocity vector toward the robot.

35. The mobile floor cleaning robot of claim 33, wherein the controller executes a heuristic related to color blob size and color blob speed to filter out color blobs non-indicative of debris on the floor surface.

36. The mobile floor cleaning robot of claim 20, wherein the controller assigns a numerical representation for the color of each pixel in a color space.

37. The mobile floor cleaning robot of claim 36, wherein the controller color quantizes the image pixels in a red-green-blue color space, reducing the image to a 9-bit red-green-blue image.

38. The mobile floor cleaning robot of claim 36, wherein the controller color quantizes the image pixels in a LAB color space.

39. A mobile floor cleaning robot comprising:
   a robot body defining a forward drive direction;
   a drive system supporting the robot body and configured to maneuver the robot over a floor surface;
   a controller in communication with the drive system and executing a control system;
   a cleaning system supported by the robot body and in communication with the controller; and
   an imaging sensor in communication with the controller;
   wherein the control system comprises a control arbitration system and a behavior system in communication with each other, the behavior system executing a cleaning behavior influencing execution of commands by the control arbitration system based on a sequence of images of the floor surface received from the imaging sensor to identify a dirty floor area and maneuver the cleaning system over the dirty floor area, the cleaning behavior identifying the dirty floor area by:
      for each image, segmenting the image into color blobs by:
         color quantizing pixels of the image;
         determining a spatial distribution of each color of the image based on corresponding pixel locations; and
         for each image color, identifying areas of the image having a threshold spatial distribution for that color; and
      tracking a location of each color blob with respect to the imaging sensor across the sequence of images.

40. A method of operating a mobile cleaning robot having an imaging sensor, the method comprising:
   receiving, at a controller, a sequence of images of a floor surface supporting the robot from an imaging sensor in communication with the controller, each image having an array of pixels;
   for each image, segmenting the image into color blobs, using the controller, by:
   color quantizing pixels of the image;
   determining a spatial distribution of each color of the image based on corresponding pixel locations; and
   for each image color, identifying areas of the image having a threshold spatial distribution for that color; and
   tracking, using the controller, a location of each color blob with respect to the imaging sensor across the sequence of images; and
   issuing a move command from the controller to a drive system of the robot to move the robot with resect to at least one color blob.

41. The method of claim 40, wherein segmenting the image into color blobs further comprises only color quantizing pixels in a lower portion of the image oriented vertically.

42. The method of claim 40, wherein segmenting the image into color blobs further comprises only color quantizing pixels outside of a center portion of the image.

43. The method of claim 40, wherein segmenting the image into color blobs further comprises dividing the image into regions and separately color quantizing the pixels of each region.

44. The method of claim 40, wherein segmenting the image into color blobs further comprises executing a bit shifting operation to convert each pixel from a first color set to second color set smaller than the first color set.

45. The method of claim 44, wherein the bit shifting operation retains the three most significant bits of each of a red, green and blue channel.

46. The method of claim 40, wherein the image sensor comprises a camera arranged to have a field of view along a forward drive direction of the robot.

47. The method of claim 46, further comprising scanning the camera imaging sensor side-to-side or up-and-down with respect to the forward drive direction of the robot.

48. The method of claim 40, wherein tracking a location of the color blobs comprises:
   determining a velocity vector of each color blob with respect to the imaging; and
   recording determined color blob locations for each image of the image sequence.

49. The method of claim 40, further comprising determining a size of each color blob.

50. The method of claim 40, further comprising issuing a drive command from the controller to the drive system to maneuver the robot based on the location of one or more color blobs.

51. The method of claim 40, further comprising issuing a drive command from the controller to the drive system to maneuver the robot toward a nearest color blob.

52. The method of claim 51, wherein the nearest color blob is identified in a threshold number of images of the image sequence.

53. The method of claim 40, further comprising:
   determining, using the controller, a size of each color blob;
   determining, using the controller, a velocity vector of each color blob with respect to the imaging sensor; and
   issuing a drive command from the controller to the drive system to maneuver the robot based on the size and the velocity vector of one or more color blobs.

54. The method of claim 53, wherein the drive command to maneuver comprises maneuvering the robot toward a color blob having the largest size and velocity vector toward the robot.

55. The method of claim 53, further comprising executing a heuristic related to color blob size and color blob speed to filter out color blobs non-indicative of debris on the floor surface.

56. The method of claim 40, further comprising assigning a numerical representation for the color of each pixel in a color space.

57. The method of claim 56, further comprising color quantizing the image pixels in a red-green-blue color space, reducing the image to a 9-bit red-green-blue image.

58. The method of claim 56, further comprising color quantizing the image pixels in a LAB color space.

59. The method of claim 40, further comprising executing a control system having a control arbitration system and a behavior system in communication with each other, the behavior system executing a cleaning behavior, the cleaning behavior influencing execution of commands by the control arbitration system based on the image segmentation to identify color blobs corresponding to a dirty floor area and color blob tracking to maneuver over the dirty floor area for cleaning using a cleaning system of the robot.

* * * * *